(12) United States Patent
Porta

(10) Patent No.: US 11,482,019 B2
(45) Date of Patent: Oct. 25, 2022

(54) EFFICIENT VEHICLE AC BASED ON CAR OCCUPANCY DETECTED BY COMPUTER VISION

(71) Applicant: Ambarella International LP, Santa Clara, CA (US)

(72) Inventor: Pier Paolo Porta, Fidenza (IT)

(73) Assignee: Ambarella International LP, Santa Clara, CA (US)

( * ) Notice: Subject to any disclaimer, the term of this patent is extended or adjusted under 35 U.S.C. 154(b) by 517 days.

(21) Appl. No.: 16/577,029

(22) Filed: Sep. 20, 2019

(65) Prior Publication Data
US 2021/0008958 A1 Jan. 14, 2021

(51) Int. Cl.
*G06V 20/59* (2022.01)
*B60Q 9/00* (2006.01)
*G06K 9/62* (2022.01)
*H04W 68/02* (2009.01)
*B60H 1/00* (2006.01)
*G06V 10/94* (2022.01)
*G06V 40/20* (2022.01)
*G06V 40/16* (2022.01)
*B60R 11/04* (2006.01)

(52) U.S. Cl.
CPC ........ *G06V 20/597* (2022.01); *B60H 1/00285* (2013.01); *B60H 1/00742* (2013.01); *B60H 1/00878* (2013.01); *B60Q 9/00* (2013.01); *G06K 9/6288* (2013.01); *G06V 10/95* (2022.01); *G06V 20/593* (2022.01); *G06V 40/171* (2022.01); *G06V 40/172* (2022.01); *G06V 40/20* (2022.01); *H04W 68/02* (2013.01); *B60R 11/04* (2013.01); *G06V 2201/07* (2022.01)

(58) Field of Classification Search
CPC .... G06V 20/597; G06V 10/95; G06V 20/593; G06V 40/171; G06V 40/172; G06V 40/20; G06V 2201/07; G06V 40/18; G06V 40/107; B60H 1/00285; B60H 1/00742; B60H 1/00878; B60Q 9/00; G06K 9/6288; H04W 68/02; B60R 11/04
USPC .......................................................... 701/36
See application file for complete search history.

(56) References Cited

U.S. PATENT DOCUMENTS

| | | | | |
|---|---|---|---|---|
| 2014/0337016 A1* | 11/2014 | Herbig | ..................... | G10L 25/27 704/201 |
| 2018/0001734 A1* | 1/2018 | Faust | .................. | B60H 1/00742 |
| 2018/0251122 A1* | 9/2018 | Golston | ............. | B60W 50/0098 |

* cited by examiner

Primary Examiner — Muhammad Shafi
(74) Attorney, Agent, or Firm — Christopher P. Maiorana, PC

(57) ABSTRACT

An apparatus including an interface and a processor. The interface may be configured to receive video frames corresponding to an interior of a vehicle. The processor may be configured to perform video operations on the video frames to detect objects in the video frames, detect one or more passengers based on the objects detected in the video frames, determine a location of each of the passengers detected and generate a climate control signal for each of said passengers. The climate control signal may be implemented to control climate settings in a plurality of climate zones within the vehicle. The processor may correlate the location of each of the passengers to the climate zones.

20 Claims, 13 Drawing Sheets

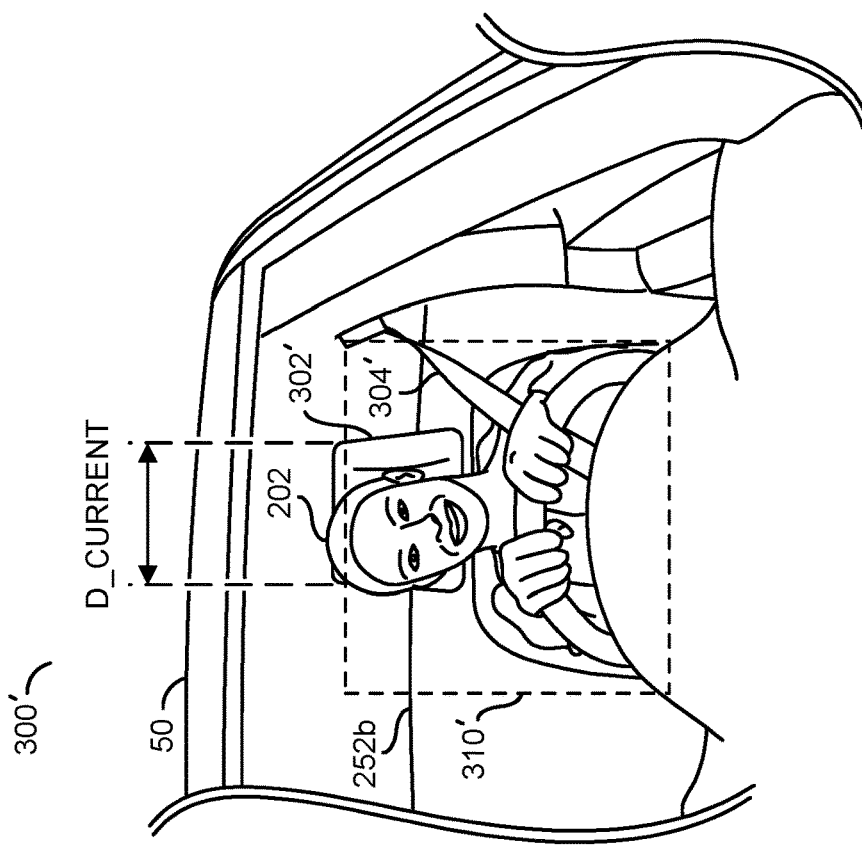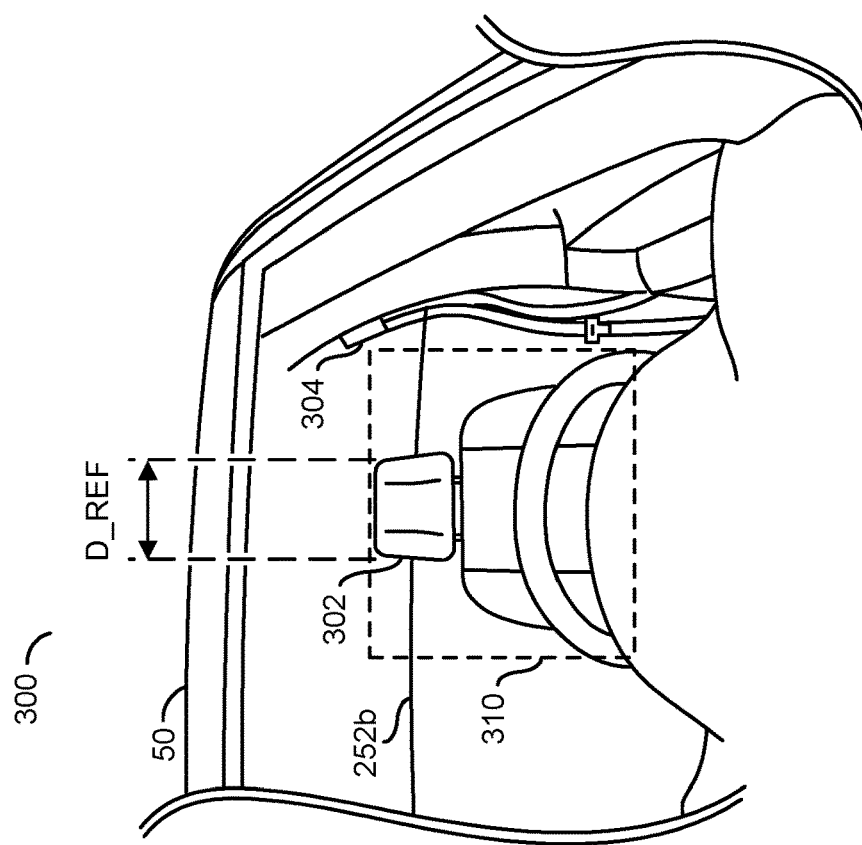
FIG. 4

EFFICIENT VEHICLE AC BASED ON CAR OCCUPANCY DETECTED BY COMPUTER VISION

This application relates to Italian Application No. 102019000011403, filed Jul. 10, 2019, which is hereby incorporated by reference in its entirety.

FIELD OF THE INVENTION

The invention relates to computer vision generally and, more particularly, to a method and/or apparatus for implementing an efficient vehicle AC based on car occupancy detected by computer vision.

BACKGROUND

People have different preferences for a comfortable environment. Some people prefer cooler temperatures while some people prefer warmer temperatures. Even if everyone in a vehicle is normally comfortable with the same temperature, different passengers may be wearing different amounts of clothing (i.e., one passenger is wearing a suit in the summer while another passenger is in shorts). Some vehicles are equipped with fan controls and air vents over the passenger seats to allow each passenger to direct airflow or control a fan speed. However, often controls can be locked, or are controlled by a console in the front seat. Even with individual manual controls, heating and cooling is applied throughout the vehicle regardless of the number of passengers. Cooling or heating an entire vehicle is inefficient when seats are empty. As the vehicle industry moves towards all-electric vehicles, efficient consumption of power becomes more important.

It would be desirable to implement an efficient vehicle AC based on car occupancy detected by computer vision.

SUMMARY

The invention concerns an apparatus including an interface and a processor. The interface may be configured to receive video frames corresponding to an interior of a vehicle. The processor may be configured to perform video operations on the video frames to detect objects in the video frames, detect one or more passengers based on the objects detected in the video frames, determine a location of each of the passengers detected and generate a climate control signal for each of said passengers. The climate control signal may be implemented to control climate settings in a plurality of climate zones within the vehicle. The processor may correlate the location of each of the passengers to the climate zones.

BRIEF DESCRIPTION OF THE FIGURES

Embodiments of the invention will be apparent from the following detailed description and the appended claims and drawings.

FIG. 4 is a diagram illustrating an object comparison between a reference video frame and a captured video frame.

DETAILED DESCRIPTION OF THE EMBODIMENTS

Figure 1:
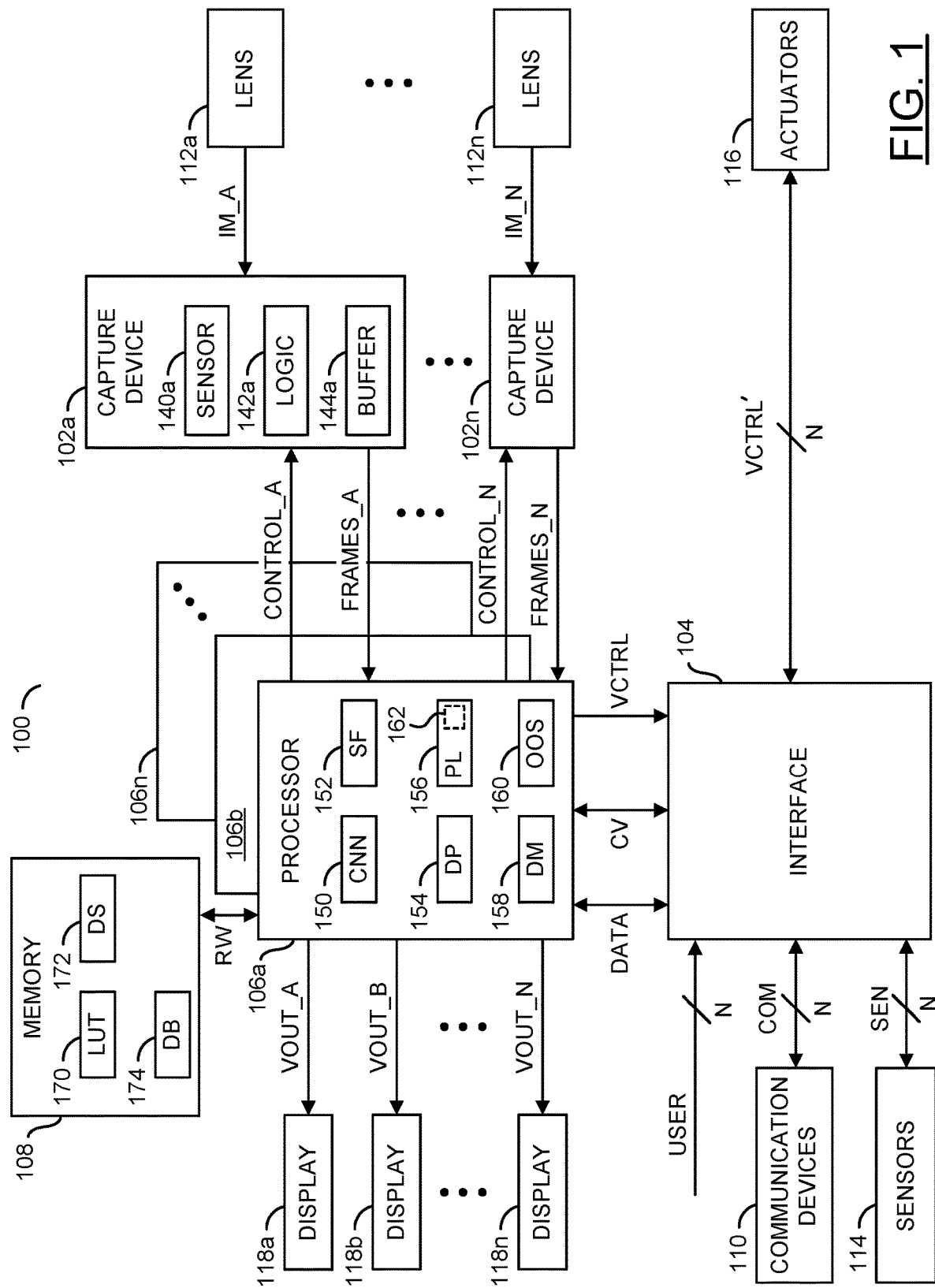
FIG. 1 is a diagram illustrating an embodiment of the present invention.

Embodiments of the present invention include providing an efficient vehicle AC based on car occupancy detected by computer vision that may (i) locate passengers within a vehicle, (ii) implement computer vision to analyze video frames of a vehicle interior, (iii) adjust heating/cooling zones in a vehicle interior, (iv) only heat/cool locations where a passengers is detected, (v) limit heating/cooling based on the characteristics of the passenger, (vi) implement hardware modules to efficiently perform operations used in computer vision and/or (vii) be implemented as one or more integrated circuits.

Embodiments of the present invention may be configured to adjust a heating/cooling system of a vehicle based on passenger occupancy. In an example, the usage of air conditioning may be optimized to save energy. Locations in the vehicle that do not have passengers may not be heated/cooled to conserve energy. Locations that do have passengers may be adjusted in response to detecting the passenger.

The interior of the vehicle may be divided into one or more climate zones. In some embodiments, each climate zone may correspond to a location of a passenger. In some embodiments, each climate zone may correspond to the heating/cooling hardware available in the vehicle (e.g., air vents, fans, heating elements, etc.). The climate settings (e.g., temperature, fan settings, seat warming, seat massaging, window control, etc.) in each climate zone may be set independently. The climate settings may be set for the climate zones where a passenger is detected.

The passengers may be detected using computer vision. Convolutional neural network-based object detection may be implemented to detect objects (e.g., passengers) within the vehicle. The computer vision operations performed may be configured to locate passengers within the vehicle to correlate the locations of the passengers with the climate zones. Embodiments of the present invention may be configured to generate control signals to adjust the climate settings in the climate zones in response to a passenger being detected in the particular climate zone. In an example, the control signal may be generated to heat or cool only the climate zones that have an occupant present.

In some embodiments, characteristics of the passengers may be detected using the computer vision operations. The characteristics of the passengers may be used to identify particular classes of passengers (e.g., children, adults, elderly, male, female, heavy clothing, light clothing, etc.). The characteristics of the passengers may be used to identify particular passengers (e.g., a unique individual). In some embodiments, in response to detecting the presence of a particular class, heating/cooling may be limited. In an example, if a child is detected, the cooling may be limited to a particular value. In some embodiments, in response to detecting a particular passenger, personal preferences for the climate settings may be selected. The amount of customization for the climate settings based on the characteristics of the detected passengers may be varied according to the design criteria of a particular implementation.

Referring to FIG. 1, a diagram illustrating an embodiment of the present invention 100 is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116 and/or blocks (or circuits) 118a-118n. The circuits 102a-102n may each implement a capture device. The circuits 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuits 118a-118n may each implement a display. The apparatus 100 may comprise other components (not shown). The number, type and/or arrangement of the components of the apparatus 100 may be varied according to the design criteria of a particular implementation.

In various embodiments of the apparatus 100, the components 102a-118n may be implemented as a distributed camera system 100. In the distributed system embodiment of the apparatus 100, each component may be implemented separately throughout an installation location (e.g., such as a vehicle). In some embodiments of the apparatus 100, the components 102a-118n may be implemented on a printed circuit board (e.g., a single module). In the single module embodiment, each component may be connected to a single module (e.g., such as a circuit board on a small device such as a drone). In some embodiments, some of the components 102a-118n may be implemented on a single module and some of the components 102a-118n may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle). In some embodiments, one or more of the components 102a-118n may be components separate from the apparatus 100 that may be accessed by the interface 104 and/or the processors 106a-106n.

In some embodiments, the apparatus 100 may implement one of the processors 106a-106n. In some embodiments, the apparatus 100 may implement multiple processors 106a-106n. For example, the processors 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, the one or more of the components 102a-118n may be implemented as part of another one of the components 102a-118n. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, lenses 112a-112n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., one of the displays 118a-118n).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to receive a respective one of the signals IM_A-IM_N, a respective signal (e.g., CONTROL_A-CONTROL_N) and/or present a respective signal (e.g., FRAMES_A-FRAMES_N).

The capture devices 102a-102n may each be configured to generate images and/or video frames in response to the signals IM_A-IM_N (e.g., perform an analog to digital conversion). The capture devices 102a-102n may capture data received through the lenses 112a-112n to generate video image data (e.g., generate video frames). The signals FRAMES_A-FRAMES_N may comprise video frames and/or images generated by the capture devices 102a-102n (e.g., video data). In some embodiments, the capture devices 102a-102n may be configured to perform depth sensing (e.g., the signals FRAMES_A-FRAMES_N may comprise depth information and/or vector light data in addition to the video frames). In one example, the capture devices 102a-102n may perform depth sensing using stereo cameras (e.g., cameras configured as a stereo pair to capture a depth map). In another example, the capture devices 102a-102n may perform depth sensing using time-of-flight. In yet another example, the capture devices 102a-102n may perform depth sensing using structured light. The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The interface 104 may comprise a data bus, traces, connectors, wires and/or pins. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement a convolutional neural network (CNN) module. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The modules 150-160 may each be implemented as dedicated hardware modules of the processors 106a-106n. The number, type and/or arrangement of the components of the processors 106a-106n may be varied according to the design criteria of a particular implementation.

The processors 106a-106n may be configured to execute computer readable code and/or process information. The processors 106a-106n may each be configured to receive the signals FRAMES_A-FRAMES_N, transmit the signal VCTRL, signals (e.g., VOUT_A-VOUT_N) and/or send/receive the signal DATA, the signal CV and/or a signal (e.g., RW). The signals VOUT_A-VOUT_N may each provide a video data output to a corresponding one of the displays 118a-118n. For example the processors 106a-106n may be configured to generate the video data (e.g., VOUT_A-VOUT_N) for the displays 118a-118n in response to the video frames (e.g., FRAMES_A-FRAMES_N). The signal RW may communicate data to/from the memory 108. The signal VOUT_A-VOUT_N, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown). The number and/or type of signals communicated by the processor 106a-106n may be varied according to the design criteria of a particular implementation.

The memory 108 may comprise a block (or circuit) 170, a block (or circuit) 172 and/or a block (or circuit) 174. The block 170 may implement a look up table. The block 172 may implement data storage. The block 174 may implement database storage (e.g., image feature sets, vehicle status, view options, GNSS/GPS positions, a schedule of a user, driver behavior, expected travel times/routes, user preferences, etc.). The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. In some embodiments, the memory 108 may be implemented as part of a black box recorder implemented to survive collisions (e.g., to preserve data to assist in an investigation). The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/

5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a LIDAR device, an array of LIDAR devices, an ultra-sound device, an array of ultra-sound devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, engage/disengage locks, adjust heating/cooling control settings, adjust fan speed, adjust heated seats, etc. The actuators 116 may control various components of the host vehicle. The number, type and/or functionality of the actuators 116 may be varied according to the design criteria of a particular implementation.

The displays 118a-118n may each implement a screen and/or an output device. In one example, one or more of the displays 118a-118n may implement an electronic mirror (e.g., an e-mirror). In another example, one or more of the displays 118a-118n may implement a touchscreen for an infotainment system. In yet another example, one or more of the displays 118a-118n may implement a back-up camera and/or bird's-eye view camera. The displays 118a-118n may display a version of video frames captured by one or more of the lenses 112a-112n and/or the capture devices 102a-102n. The video frames captured by the capture device 102a-102n may be cropped, adjusted and/or encoded by the processors 106a-106n to fit the displays 118a-118n. For example, the processor 106a-106n may provide real-time video streaming to the displays 118a-118n via the signals VOUT_A-VOUT_N.

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The logic 142a may transform the bitstream into a human-legible content (e.g., video data and/or video frames). For example, the logic 142a may receive pure (e.g., raw) data from the camera sensor 140a and generate video data based on the raw data (e.g., the bitstream). The logic 142a may further control the lens 112a in response to the signal CONTROL_A. The memory buffer 144a may store the raw data and/or the processed bitstream. For example, the frame memory and/or buffer 144a may store (e.g., provide temporary storage and/or cache) one or more of the video frames (e.g., the video signal). In some embodiments, each of the capture devices 102a-102n may comprise other components (e.g., a battery, a motor, a microphone, etc.).

In some embodiments, the sensor 140a may implement an RGB-InfraRed (RGB-IR) sensor. The sensor 140a may comprise a filter array comprising a red filter, a green filter, a blue filter and a near-infrared (NIR) wavelength filter (e.g., similar to a Bayer Color Filter Array with one green filter substituted with the NIR filter). The sensor 140a may operate as a standard color sensor and a NIR sensor. Operating as a standard color sensor and NIR sensor may enable the sensor 140a to operate in various light conditions (e.g., day time and night time).

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection. Details of the computer vision operations implemented by the CNN module 150 may be described in association with FIG. 5.

The CNN module 150 may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 150 to find the most probable correspondences between feature points in a reference frame and a target frame. In a process to match pairs of reference and target feature points, each feature point may be represented by a descriptor (e.g., image patch, SIFT, BRIEF, ORB, FREAK, etc.). Implementing the CNN module 150 using dedicated hardware circuitry may enable calculating descriptor matching distances in real time.

The CNN module 150 may be a dedicated hardware module configured to perform feature detection of the video frames. The features detected by the CNN module 150 may be used to calculate descriptors. The CNN module 150 may determine a likelihood that pixels in the video frames belong to a particular object and/or objects in response to the descriptors. For example, using the descriptors, the CNN module 150 may determine a likelihood that pixels correspond to a particular object (e.g., a person, a vehicle, a car seat, a tree, etc.) and/or characteristics of the object (e.g., a mouth of a person, a hand of a person, headlights of a vehicle, a branch of a tree, a seatbelt of a seat, etc.). Implementing the CNN module 150 as a dedicated hardware module of the processors 106a-106n may enable the apparatus 100 to perform the computer vision operations locally (e.g., on-chip) without relying on processing capabilities of a remote device (e.g., communicating data to a cloud computing service).

The computer vision operations performed by the CNN module 150 may be configured to perform the feature detection on the video frames in order to generate the descriptors. The CNN module 150 may perform the object detection to determine regions of the video frame that have a high likelihood of matching the particular object. In one example, the types of object to match against (e.g., reference objects) may be customized using the open operand stack module 160. The CNN module 150 may be configured to perform local masking to the region with the high likelihood of matching the particular object(s) to detect the object.

The sensor fusion module 152 may be configured to analyze information from multiple sensors 114, capture devices 102a-102n and/or the database 174 for redundancy. By analyzing various data from disparate sources, the sensor fusion module 152 may be capable of making inferences about the data that may not be possible from one of the data sources alone. For example, the sensor fusion module 152 may analyze video data as well as radar, LIDAR, inertial, motion, V2X, location data (e.g., GPS, GNSS, ADAS, etc.), gaze direction, driver state, battery status and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by LIDAR for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing (e.g., electronic image stabilization (EIS)), downscaling, packetizing, compression, conversion, blending, synchronizing and/or other video operations.

The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline 156 may enable 4K ultra high resolution with H.264 encoding at double real time speed (e.g., 60 fps), 4K ultra high resolution with H.265/HEVC at 30 fps, 4K AVC encoding and/or other types of encoding (e.g., VP8, VP9, AV1, etc.). The video data generated by the video pipeline module 156 may be compressed (e.g., using a lossless compression and/or a low amount of lossiness). The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the displays 118a-118n (e.g., the signal VOUT_A-VOUT_N).

The video pipeline module 156 may implement scheduling. Scheduling may enable the video pipeline 156 to perform various discrete, asynchronous video operations and/or computer vision operations in parallel. The scheduling may enable data results from one video operation to be available by the time another video data operation needs the data results.

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The decision making module 158 may be further configured to determine the video data to communicate to the displays 118a-118n. The signals VOUT_A-VOUT_N may be cropped and/or adjusted in response to decisions by the decision making module 158. For example, the decision module 158 may select one field of view (e.g., a wide angle field of view) instead of another field of view (e.g., a narrow angle field of view) to send to the display 118a as the signal VOUT_A. In another example, the decision making module 158 may determine which of the displays 118a-118n to use to display a notification (e.g., an advertisement) and/or where on the video data to place the notification. In yet another example, the decision making module 158 may adjust output characteristics of the displays 118a-118n (e.g., brightness, contrast, sharpness, etc.).

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The video processing pipeline 156 is shown comprising a block (or circuit) 162. The circuit 162 may implement a computer vision pipeline portion. The computer vision pipeline portion 162 may be configured to implement a computer vision algorithm in dedicated hardware. The computer vision pipeline portion 162 may implement a number of sub-modules designed to perform various calculations used to perform feature detection in images (e.g., video frames). Implementing sub-modules may enable the hardware used to perform each type of calculation to be optimized for speed and/or efficiency. For example, the sub-modules may implement a number of relatively simple operations that are used frequently in computer vision operations that, together, may enable the computer vision algorithm to be performed in real-time. The computer vision pipeline portion 162 may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

The database storage 174 may comprise information about user preferences for one or more users of a vehicle. In an example, different drivers may have different driving behaviors (e.g., time of day the driver travels, the usual routes the driver travels, camera view preferences, etc.). The database storage 174 may be comprise information about particular conditions associated with selecting particular camera views for display. The type of data stored about each driver and/or vehicle occupant in the database storage 174 may be varied according to the design criteria of a particular implementation.

The database storage 174 may comprise information about detected events. The decision module 158 may determine whether an event has occurred based on information from the CNN module 150 and/or the sensor fusion module 152. An event may be a scenario determined by the decision module 158 to be worth storing information about (e.g., a collision, an unknown object detected, a near miss, etc.). The database storage 174 may store metadata corresponding to the detected event. The metadata may comprise a location, a time-of-day timestamp, detected weather conditions, speed of the vehicles, acceleration of the vehicles, etc.). In some embodiments, the metadata may comprise a log of all the measurements of the sensors 114.

In some embodiments, the database storage 174 may comprise information about particular individuals. In an example, the database storage 174 may comprise information about faces for one or more people. The facial information may be used to perform facial recognition to identify a passenger as a particular person. In an example, the facial information may comprise descriptors and/or features corresponding to one or more individuals (e.g., the vehicle owner and the family members of the vehicle owner). The facial information stored in the database 174 may be used to enable the apparatus 100 to perform specific actions for specific people.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of a particular one of the displays 118a-118n by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the displays 118a-118n. For example, the panoramic video may comprise a spherical video, a hemi-spherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signals VOUT_A-VOUT_N may be encoded, cropped, stitched and/or enhanced versions of one or more of the signals FRAMES_A-FRAMES_N. The signals VOUT_A-VOUT_N may be high resolution, digital, encoded, de-warped, stabilized, cropped, down-scaled, packetized, blended, stitched and/or rolling shutter effect corrected versions of the signals FRAMES_A-FRAMES_N. The enhanced versions of the signals FRAMES_A-FRAMES_N may improve upon the view captured by the lenses 112a-112n (e.g., provide night vision, provide High Dynamic Range (HDR) imaging, provide more viewing area, highlight detected objects, provide additional information such as numerical distances to detected objects, provide bounding boxes for detected objects, etc.).

The processors 106a-106n may be configured to implement intelligent vision processors. The intelligent vision processors 106a-106n may implement multi-object classification. In one example, multi-object classification may comprise detecting multiple objects in the same video frames using parallel processing that reduces power consumption and/or computational resources compared to detecting multiple objects one object at a time. The multi-object classification may further comprise determining multiple inferences at a time (e.g., compared to first detecting whether an object exists, then detecting that the object is a driver, then determining whether the driving is holding the steering wheel, etc.).

Figure 2:
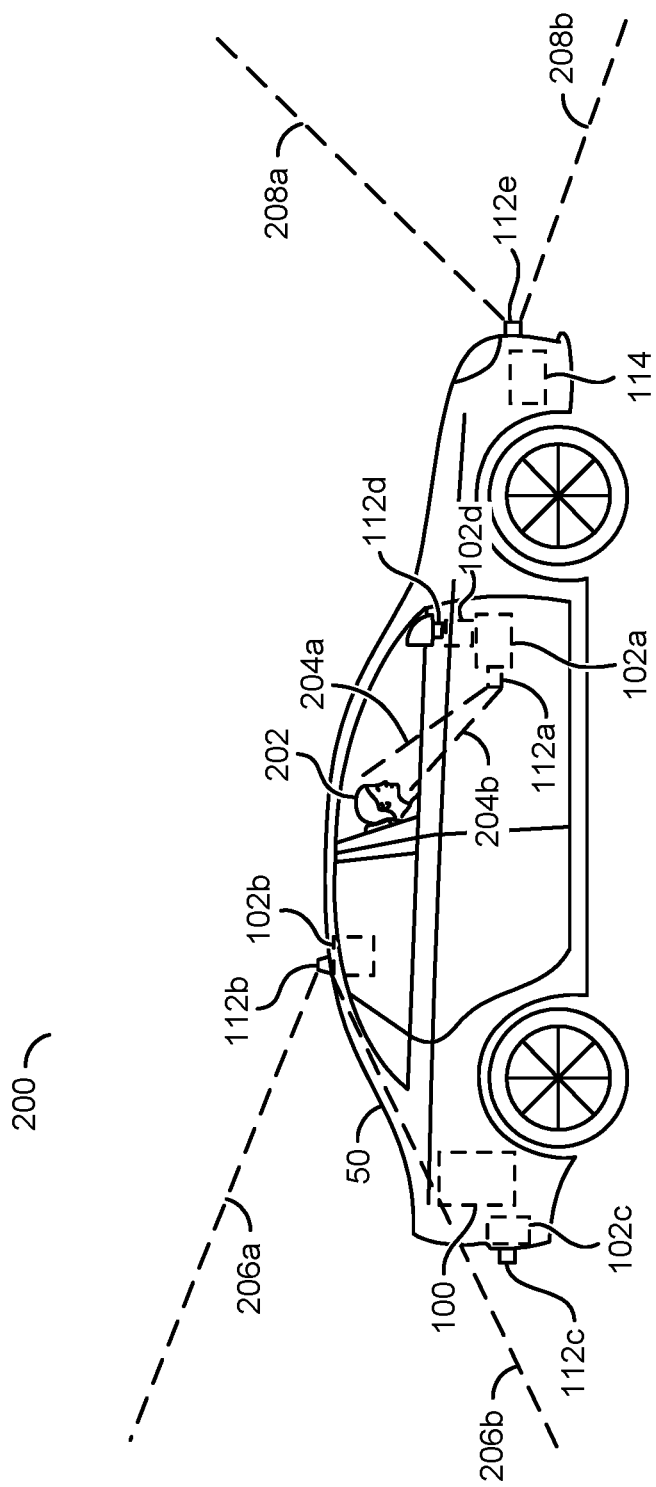
FIG. 2 is a diagram illustrating an example of camera systems inside and outside of a vehicle.

Referring to FIG. 2, a diagram illustrating an example embodiment 200 of camera systems inside and outside of a vehicle is shown. An automobile/vehicle 50 is shown. The apparatus 100 is shown as a component of the vehicle 50 (e.g., an ego vehicle). In the example shown, the ego vehicle 50 is a car. In some embodiments, the ego vehicle 50 may be a truck, an ATV, an airplane, a drone, etc. The type of the ego vehicle 50 implementing the apparatus 100 may be varied according to the design criteria of a particular implementation.

A driver 202 is shown seated in the ego vehicle 50. The vehicle sensors 114 are shown on (or in) the ego vehicle 50. The apparatus 100 is shown in the rear of the ego vehicle 50. In another example, the apparatus 100 may be distributed throughout the ego vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation.

A camera (e.g., the lens 112a and the capture device 102a) is shown capturing an interior of the ego vehicle 50 (e.g., detecting the driver 202). A targeted view of the driver 202 (e.g., represented by a line 204a and a line 204b) is shown being captured by the capture device 102a. The capture device 102a may also detect other objects in the ego vehicle 50 (e.g., a seat, a head rest, an arm rest, a rear window, a seatbelt, a center console, other occupants, etc.). By analyzing video of the driver 202 and/or other occupants of the ego vehicle 50 (e.g., extracting video data from the captured video), the processors 106a-106n may determine a body position and/or body characteristics (e.g., a distance, orientation and/or location of the body and/or head) of one or more occupants of the ego vehicle 50 and/or objects within the ego vehicle 50.

In some embodiments, more than one of the capture devices 102a-102n may be used to capture video data of the driver 202 and/or other occupants of the ego vehicle 50. A combination of inputs from the signals FRAMES_A-FRAMES_N may be used to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112c and the capture device 102c) is shown capturing a targeted view from the ego vehicle 50. In the example shown, the targeted view from the ego vehicle 50 (e.g., represented by a line 206a and a line 206b) is shown capturing an exterior view to the rear of (e.g., an area behind) the ego vehicle 50. Similarly, other cameras may be used to capture video data of a targeted view from the vehicle (e.g., shown as the lens 112c and the camera sensor 102c, the lens 112d and the camera sensor 102d, etc.). For example, the targeted view (e.g., represented by a line 208a and a line 208b) may provide a front exterior view of an area. The number of cameras implemented, a direction captured, an orientation of the cameras and/or an arrangement of the cameras may be varied according to the design criteria of a particular implementation.

The capture devices 102a-102n may be configured to capture video data of the environment around (e.g., area near) the ego vehicle 50. The processors 106a-106n may implement computer vision to detect objects and/or understand what is happening near the ego vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a LIDAR device, an array of LIDAR devices, an ultra-sound device, an array of ultra-sound devices, etc.

The sensor fusion module 152 may aggregate data from the sensors 114, the CNN module 150 and/or the video pipeline 156 to build a model and/or abstraction of the environment around the ego vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the ego vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

Figure 3:
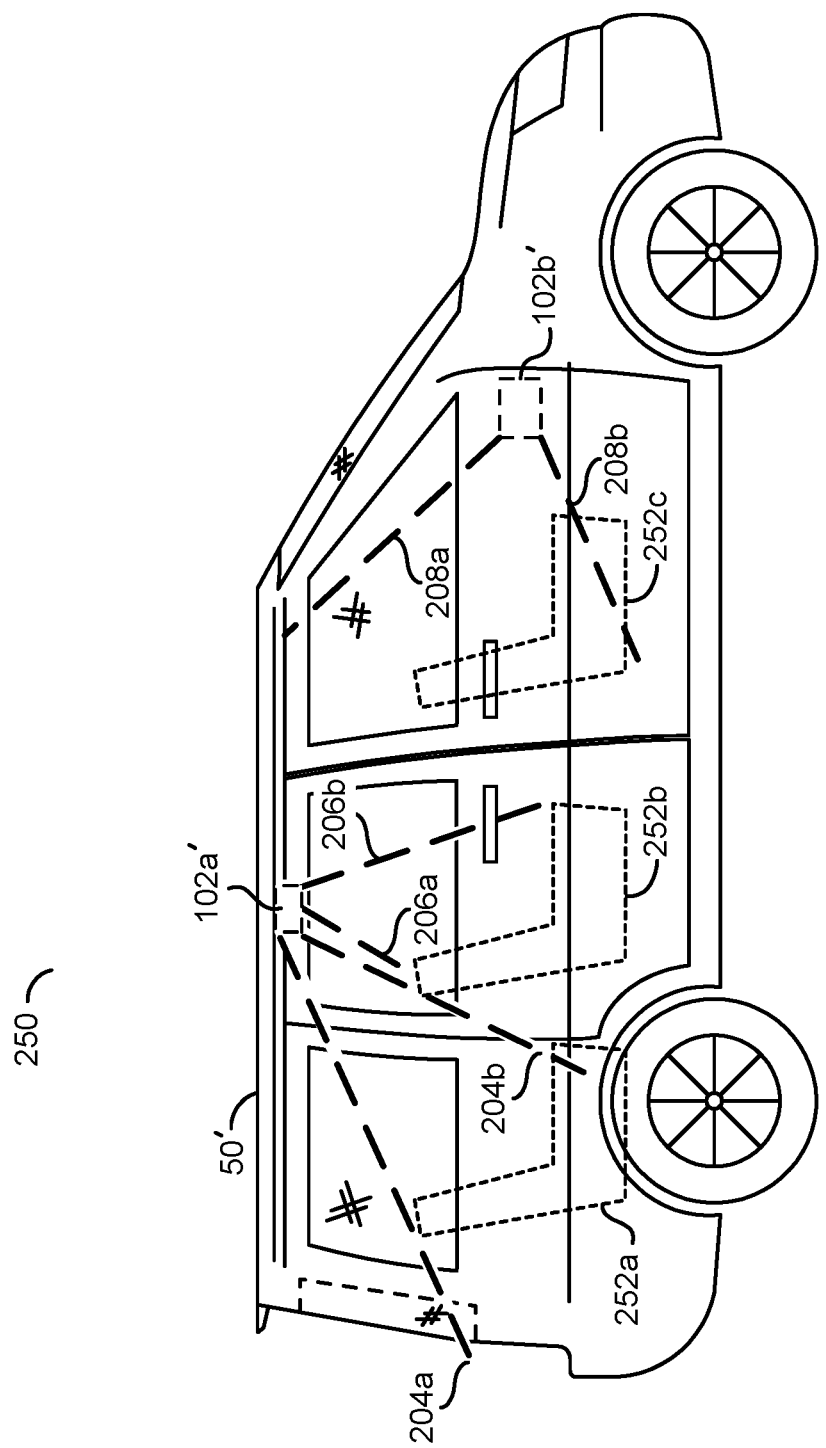
FIG. 3 is a diagram illustrating an example of interior camera systems configured to monitor vehicle occupants.

Referring to FIG. 3, a diagram illustrating an example 250 of interior camera systems configured to monitor vehicle occupants is shown. Various camera angles of an interior of the ego vehicle 50' are shown. Multiple rows of seats 252a-252c are shown in the ego vehicle 50'. Each of the rows of seats 252a-252c may be monitored to detect and/or classify one or more occupants of the ego vehicle 50'. The apparatus 100 may be configured to adjust a position of one or more seats in the rows of seats 252a-252c.

The capture device 102a' is shown mounted on a ceiling of the vehicle 50'. The capture device 102a' is shown having an angle 204a and an angle 204b (e.g., a field of view) that points toward the back row of seats 252a. The capture device 102a' may also have a field of view angle 206a-206b to capture the middle row of seats 252b. In another example, the capture device 102a' may implement a wide angle lens to capture both rows of seats. The field of view from the angle 204a and the angle 204b may provide a targeted view of the interior of the vehicle 50'. Similarly, the capture device 102b' may capture an interior of the vehicle 50'. An angle 208a and an angle 208b may represent a field of view capturing the front row of seats 252c. The multiple fields of view captured by the capture devices 102a'-102n' may be a targeted wide angle view of the interior of the vehicle 50'. The number of angles and/or fields of view may be varied according to the design criteria of a particular implementation.

The processors 106a-106n may be configured to analyze the captured video signal. The processors 106a-106n may detect objects in the captured video signal of the exterior of a vehicle (e.g., automobiles, bicycles, pedestrians, animals, parking spaces, etc.) and/or of an interior of a vehicle (e.g., the driver 202, other occupants, physical characteristics of people in the vehicle, facial expressions of people in the vehicle, fields of view of the people in the vehicle, etc.). The processors 106a-106n may be configured to determine a presence, an absolute location and/or a relative location of the detected objects. Based on the detected objects, the processors 106a-106n may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106a-106n. For example, the data received may comprise external signals generated in response to user input, external signals generated by the sensors 114 and/or internally generated signals such as signals generated by the processors 106a-106n in response to analysis of the video data and/or objects detected in video data.

The processors 106a-106n may process video data that may not be seen by a person (e.g., not output to the displays 118a-118n). For example, the video data may be internal to the processors 106a-106n. Generally, the processors 106a-106n perform the computer vision operations in order to interpret the environment to emulate how a person would see the environment and/or provide greater sensory capability than a human. For example, the processors 106a-106n may interpret the environment in many directions at once (e.g., a 360 degree field of view) while a person has a limited field of view.

The video analytics performed by the processors 106a-106n may be performed on more than one video frame. For example, the processors 106a-106n may analyze a series (or sequence) of video frames. In some embodiment, the processors 106a-106n may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands), determine a vulnerability of an occupant (e.g., a non-moving occupant may be asleep and/or unconscious) and/or determine an expected path of a detected object (e.g., determine speed, acceleration and direction to determine a trajectory). The expected path may be further determined based on context such the type of object and/or the shape of the roadway (e.g., a vehicle with a straight trajectory will likely follow the curve of a roadway instead of continuing to drive straight off the road). In another example, tracking a static object across video frames temporally may be implemented to determine a status of an object. For example, the windshield may be tracked over time to determine that visibility has been reduced and/or increased (e.g., due to frost forming and/or disappearing).

In some embodiments, the processors 106a-106n may implement depth-sensing techniques. The depth-sensing techniques may compare knowledge of the dimensions of the ego vehicle 50' to the location and/or body position of the occupants. The processors 106a-106n may cross-reference a body position of the occupants with a location of the components of the vehicle (e.g., how far away the driver is from the steering wheel).

In some embodiments, the video analytics may process the captured video frames for biometric markers to determine a vulnerability of the occupants of the ego vehicle 50'. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106a-106n may be configured to detect faces in a region of a video frame. In some embodiments, facial recognition may be implemented (e.g., based on faces stored as references in the memory 108 and/or an external database accessible by the communication devices 110). In some embodiments, the processors 106a-106n may be configured to detect objects and classify the objects as a particular type of object (e.g., an elderly person, a child, an animal, etc.).

The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106*a*-106*n* may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processors 106*a*-106*n*.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106*a*-106*n*. The processors 106*a*-106*n* may be configured to determine a current size, shape and/or color of the objects (e.g., to perform a classification). One or more of the objects may be detected in each video frame. The processors 106*a*-106*n* may determine a number of pixels (e.g., a width, a height and/or a depth) comprising the detected objects in each video frame portion of a video frame and/or region of a video frame. Based on the number of pixels of each of the detected objects in the video frame, the processors 106*a*-106*n* may estimate a classification of the detected objects and/or adjust the confidence level.

The computer vision operations may be performed on video frames received from the various capture devices 102*a*-102*n*. The capture devices 102*a*-102*n* may comprise various types of cameras (e.g., IR, depth measuring cameras such as stereo, time-of-flight and/or structured light cameras, Bayer cameras, RCCB, RCCC, etc.). The computer vision operations may be performed on the video frames FRAMES_A-FRAMES_N generated by various configurations of the capture devices 102*a*-102*n*. In one example, the computer vision operations may be performed based on video frames captured by a single camera. In another example, the computer vision operations may be performed based on video frames captured by multiple cameras configured to capture images of different locations. The sensor fusion module 152 may enable the computer vision operations to be supplemented by the user of the sensors 114 (e.g., radar, occupancy sensors, temperature sensors, location/orientation sensors, etc.). The type of capture devices implemented may be varied according to the design criteria of a particular implementation.

The memory 108 may store the pre-determined locations and/or a pre-determined field of view of each of the capture devices 102*a*-102*n*. The memory 108 may store reference data corresponding to the objects. For example, the memory 108 may store reference color histograms about various known types of objects. In another example, the memory 108 may store previously captured frames (e.g., a reference image from when the ego vehicle 50' was parked, when the ego vehicle 50' came out of production, a reference image from when a car was in operation, turned off, left unattended, etc.). The type of reference information stored by the memory 108 may be varied according to the design criteria of a particular implementation.

The CNN module 150 may be configured to "train" the processors 106*a*-106*n* to know (e.g., store in the memory 108) the objects and/or expected locations (or areas) that the objects may detect in a video frame. The video analytics performed by the processors 106*a*-106*n* may determine whether the detected objects are exterior to or interior to the ego vehicle 50'. The processors 106*a*-106*n* may be configured to respond differently to different types of objects. For example, if the classified object is a person, the processors 106*a*-106*n* may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106*a*-106*n* to detect the presence of occupants even if there is no motion by the occupants.

The processors 106*a*-106*n* may determine the width of the reference objects (e.g., based on the number of pixels occupied in the video frame). The memory 108 may store (e.g., in the look up table 170) the width of the reference objects. The processors 106*a*-106*n* may determine the width of the reference objects (e.g., the number of pixels in the video frame). The width of the current size of the reference object may be compared to the stored width of the reference object to estimate a distance of the occupants of the ego vehicle 50 from the lens 112*a*-112*n*. For example, a number of pixels may be measured between the reference object and the head of the driver 202 to determine location coordinates of the head of the driver 202.

In some embodiments, the processors 106*a*-106*n* may determine the position (e.g., 3D coordinates and/or location coordinates) of various features (e.g., body characteristics) of the occupants of the ego vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112*a*-112*n* may represent one coordinate (e.g., a location coordinate on a third axis) for a depth location of the body part in 3D space. Using the location of various body parts in 3D space, the processors 106*a*-106*n* may determine body position, body characteristics and/or the vulnerability of the occupants.

In some embodiments, the processors 106*a*-106*n* may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106*a*-106*n* may present the recording of the driver 202 to one of the displays 118*a*-118*n* (e.g., as a live stream for use in teleconferencing). The processors 106*a*-106*n* may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., a RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or the capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360 degree field of view, less than a 360 degree field of view, etc.).

In some embodiments, the processors 106a-106n may analyze reference video frames. Reference video frames may be used by the processors 106a-106n to classify, analyze and/or store reference objects. The reference objects may be used by the processors 106a-106n to compare with objects captured in newly acquired (e.g., current) video frames. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. In one example, a distance to an object may be determined by comparing a number of pixels occupied by a particular object in the reference frame to the number of pixels occupied by the object in the current video frame. The types of reference objects and/or characteristics of the reference objects may be varied according to the design criteria of a particular implementation.

In some embodiments, the processors 106a-106n may compare the current video frame to the reference video frame. In some embodiments, the current video frame may not be directly compared to the reference video frame. For example, the CNN module 150 may implement deep learning to gather information and/or statistics about various features of objects. The CNN module 150 may determine features of objects and/or sub-objects corresponding to the current video frame. The processors 106a-106n may compare the features extracted from the current video frame to features extracted from numerous reference video frames. For example, the reference video frame and/or the current video frame may be used as training data for the CNN module 150. The types of features extracted from video frames to perform the computer vision analysis may be varied according to the design criteria of a particular implementation.

Referring to FIG. 4, a diagram illustrating an object comparison between a reference video frame and a captured video frame is shown. The reference video frame 300 and the current video frame 300' may be video frames processed by the processors 106a-106n (e.g., generated in response to the signals FRAMES_A-FRAMES_N by one of the capture devices 102a-102n). The reference video frame 300 and the current video frame 300' may be a targeted view directed towards the interior of the vehicle 50. In an example, the lens 112a mounted on the dashboard of the vehicle 50 may capture the reference video frame 300 and the current video frame 300'. The view captured for each of the video frames may be varied according to the design criteria of a particular implementation.

The reference video frame 300 may be a video frame captured at an earlier time than the current video frame 300'. For example, the reference video frame 300 may be stored in the memory 108 (e.g., in the data storage portion 172). In some embodiments, the reference video frame 300 may be pre-loaded in the apparatus 100. For example, the reference video frame 300 may be captured by implementing fleet learning (e.g., to be described in more detail in association with FIG. 5). In some embodiments, the reference video frame 300 may be captured when the vehicle 50 is idle and/or turned off. In some embodiments, the reference video frame 300 may be captured periodically. The method of capturing the reference video frame (or frames) 300 may be varied according to the design criteria of a particular implementation.

The reference video frame 300 shown may be a representative example of one or more reference video frames implemented by the apparatus 100. In an example, reference video frames 300 may be captured for many different scenarios and/or locations within or outside of the vehicle 50. For example, the reference video frames 300 may be captured for a driver seat, a passenger seat, for each seat of the rows 252a-252c, the interior of the vehicle 50, the exterior of the vehicle 50, etc. Generally, the reference video frame 300 is used by the processors 106a-106n to classify, analyze and/or store reference objects. The reference objects may be used by the processors 106a-106n to compare with objects captured in the current video frame 300'. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. The types of reference objects and/or characteristics of the reference objects may be varied according to the design criteria of a particular implementation.

In the example reference video frame 300, a reference object 302 is shown. In the example shown, the reference object 302 may be a head rest of the driver side seat. The CNN module 150 may determine the width (e.g., D_REF) of the reference object 302 (e.g., based on the number of pixels occupied in the reference video frame 300). In some embodiments, the look up table 170 may store the width D_REF. The width D_REF may be determined when the reference object 302 is at a known distance from the lens 112a.

In the example reference video frame 300, a reference object 304 is shown. In the example shown, the reference object 304 may be a driver seat belt. The CNN module 150 may determine a location of the seat belt 304 (e.g., a location based on a horizontal and/or vertical pixel count). In some embodiments, sensors 114 may provide an indication of the status of the seat belt 304 (e.g., clicked into place, unused, etc.). The sensor fusion module 152 may use the computer vision data from the CNN module 150 and/or the readings of the sensors 114 to determine a confidence level of the status of the seat belt 304. In the example shown, the reference video frame 300 may provide a reference for when the status of the seat belt 304 is unused (e.g., not being worn by a passenger/driver).

In the example reference video frame 300, a reference object 310 is shown. In the example shown, the reference object 310 may be an unoccupied seat. For example, the CNN module 150 may recognize color, shape, distance, stitching, design, etc. of the reference object 310.

The current video frame 300' may be one or more video frames analyzed by the processors 106a-106n (e.g., a video frame within the video pipeline 156). The current video frame 300' may be analyzed by the processors 106a-106n in real-time (e.g., within approximately 500 ms). The CNN module 106a-106n may perform a computer vision analysis on the current video frame 300' and/or compare features and/or characteristics of the current video frame 300' to one or more reference video frames.

The current video frame 300' shows the vehicle 50, the driver 202, the detected object 302', the detected object 304' and/or the detected object 310'. In the current video frame 300', the head rest 302' may be closer to the lens 112a than in the reference video frame 300. In the current video frame 300', the status of the seat belt 304' may be determined to be worn by the driver 202 (e.g., detected across the chest of the driver 202). In the current video frame 300', the detected object 310' may be the driver 202 sitting in the driver seat (e.g., an object covering the details of the empty seat 310 in the reference video frame 300). The processors 106a-106n may detect and/or determine characteristics of various sub-objects of the detected object 310'. In an example, the processors 106a-106n may identify sub-objects such as the eyes of the driver 202, locations of the arms and hands (e.g., holding the steering wheel), location of the hands on the steering wheel (e.g., at the ten and two position of the steering wheel) an angle of the head, a rotation of the head, field of view of the driver (e.g., direction of the eyes), body rotation, body lean, body orientation, a color of clothing, etc.

In some embodiments, one or more of the reference objects (e.g., the head rest 302) may be physically connected to the vehicle 50. In an example, the reference objects may be an arm rest, a steering wheel, the rear seat row 252n, a dashboard, a sunroof and/or a moon roof. The reference object 302 may be a vehicle component that is capable of relative movement with respect to the lens 112a. In some embodiments, the reference object (e.g., the head rest 302) may be used to determine a distance of the driver 202 from the lens 112a (e.g., objects that correlate to where the driver 202 is seated).

For example, if the headrest 302' is determined to be 4.5 feet away (e.g., by comparing the current size D_CURRENT to the reference size D_REF to infer a distance) from the lens 112a then an average sitting posture and head size may be used to estimate that the eyes of the driver 202 may be 3.5 feet from the lens 112a. In another example, the capture device 102a may implement depth-sensing technology to determine how far away the driver 202 is from the lens 112a. In yet another example, stereo video processing may be implemented by the processors 106a-106n to generate a depth map to determine how far away the driver 202 is from the lens 112a. Using the depth information and/or a horizontal and vertical position of the detected object 310', the processors 106a-106n may determine the position (e.g., 3D coordinates and/or location coordinates) of the driver 202 and/or particular body parts of the driver 202.

In some embodiments, the processors 106a-106n may compare the current video frame 300' to the reference video frame 300. In some embodiments, the current video frame 300' may not be directly compared to the reference video frame 300. For example, the CNN module 150 may implement deep learning to gather information and/or statistics about various features of objects. The CNN module 150 may determine features of objects corresponding to the current video frame 300'. The processors 106a-106n may compare the features extracted from the current video frame 300' to features extracted from numerous reference video frames. For example, the reference video frame 300 and/or the current video frame 300' may be used as training data for the CNN module 150. The types of features extracted from video frames to perform the computer vision analysis may be varied according to the design criteria of a particular implementation.

Figure 5:
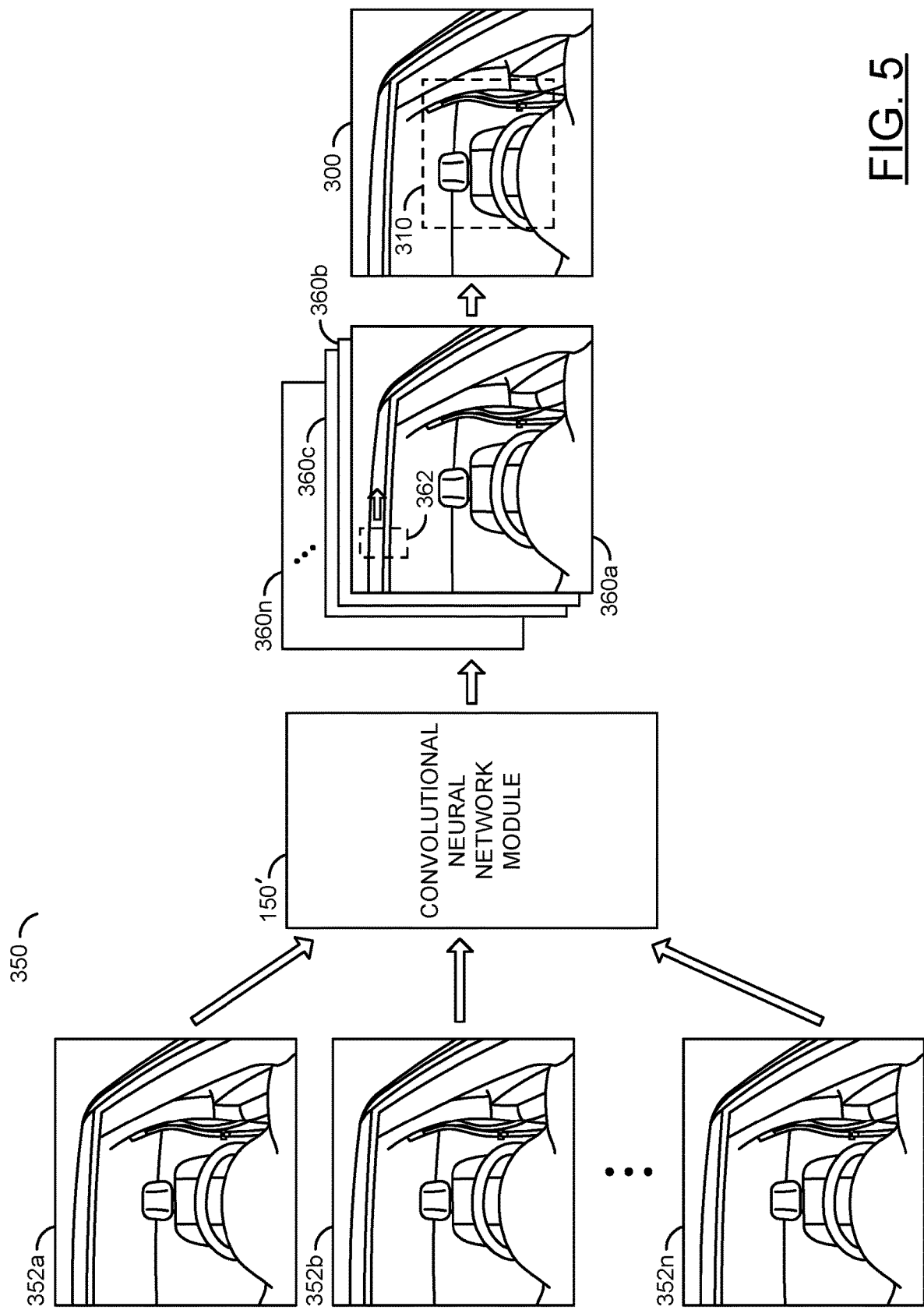
FIG. 5 is a diagram illustrating an example visualization of training a convolutional neural network for object detection using fleet learning.

Referring to FIG. 5, a diagram illustrating an example visualization 350 of training a convolutional neural network for object detection using fleet learning is shown. To detect objects using computer vision, the convolutional neural network 150' may be trained using training data 352a-352n. The training data 352a-352n may comprise a large amount of information (e.g., input video frames). The information for the training data 352a-352n may be received using the video data (e.g., the signals FRAMES_A-FRAMES_N) processed by the video pipeline module 156.

While the apparatus 100 is in operation, the CNN module 150 may continually learn using new video frames as the input training data 352a-352n. However, the processors 106a-106n may be pre-trained (e.g., configured to perform computer vision before being installed in the vehicle 50). For example, the results of training data 352a-352n may be pre-programmed and/or loaded into the processors 106a-106n. In some embodiments, the signal CV generated by the processors 106a-106n may be sent to the interface 104 to enable the communication devices 110 to upload computer vision information (e.g., to a centralized service and/or peer-to-peer communication). Similarly, the communication devices 110 may receive computer vision data and the interface 104 may generate the signal CV in order to update the CNN module 150.

In some embodiments, fleet learning may be implemented to gather large amounts of the training data 352a-352n. For example, cameras may be installed in production facilities (e.g., at the end of the production line) to capture many reference images of different types of vehicles to be used as the training data 352a-352n. In the example shown, the training data 352a-352n may capture an interior of a vehicle. In another example, the training data 352a-352n may be a sequence of video frames of a person talking on a cellular phone while driving. In yet another example, the training data 352a-352n may be various video frames of people of different ages. Using the training data 352a-352n (e.g., video frames captured from many different vehicles as the vehicles are produced), many training data sets may be available to train the CNN module 150'. In an example, different makes and models may be analyzed. In another example, different interior colors may be analyzed. In yet another example, different drivers (e.g., different people) talking while holding various models of smartphones may be analyzed. In some embodiments, the training data 352a-352n may be uploaded to a central CNN module 150' to perform and/or train the computer vision. The results of the training from the central CNN module 150' may be installed on each of the CNN modules 150 of each apparatus 100 (or transmitted while the apparatus 100 is in operation to remotely provide updates via the communication devices 110).

The CNN module 150' may receive the training data 352a-352n. To perform the training and/or the computer vision operations, the CNN module 150' may generate a number of layers 360a-360n. On each one of the layers 360a-360n, the CNN module 150' may apply a feature detection window 362. In an example, the feature detection window 362 is shown on a portion of the layer 360a. A convolution operation may be applied by the CNN module 150' on each of the layers 360a-360n using the feature detection window 362.

The convolution operation may comprise sliding the feature detection window 362 along the layers 360a-360n while performing calculations (e.g., matrix operations). The feature detection window 362 may apply a filter to pixels and/or extract features associated with each layer 360a-360n. The feature detection window 362 may be applied to a pixel and a number of surrounding pixels. In an example, the layers 360a-360n may be represented as a matrix of values representing pixels and/or features of one of the layers 360a-360n and the filter applied by the feature detection window 362 may be represented as a matrix. The convolution operation may apply a matrix multiplication between the region of the current layer covered by the feature detection window 362. The convolution operation may slide the feature detection window 362 along regions of the layers 360a-360n to generate a result representing each region. The size of the region, the type of operations applied by the filters and/or the number of layers 360a-360n may be varied according to the design criteria of a particular implementation.

Using the convolution operations, the CNN module 150' may compute multiple features for pixels of an input image in each extraction step. For example, each of the layers 360a-360n may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window 362 operates on a pixel and nearby pixels, the results of the operation may have location invariance. The layers 360a-360n may comprise convolution layers, pooling layers, non-linear layers and/or fully connected layers. In an example, the convolution operations may learn to detect edges from raw pixels (e.g., the first layer 360a), then use the feature from the previous layer (e.g., the detected edges) to detect shapes in a next layer (e.g., 360b) and then use the shapes to detect higher-level features (e.g., facial features) in higher layers and the last layer may be a classifier that uses the higher level features.

Using the input video frames as the training data 352a-352n, the CNN module 150' may be trained. The training may comprise determining weight values for each of the layers 360a-360n. For example, weight values may be determined for each of the layers 360a-360n for feature extraction (e.g., a convolutional layer) and/or for classification (e.g., a fully connected layer). The weight values learned by the CNN module 150' may be varied according to the design criteria of a particular implementation.

The CNN module 150' may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 150' to extract features from the training data 352a-352n may be varied according to the design criteria of a particular implementation.

The CNN module 150' may consume input images (e.g., the training data 352a-352n) that have multiple color channels (e.g., a luminance channel and two chrominance channels). A color detection process implemented by the video pipeline module 156 may be implemented to output images with color likelihood (or probability) values for a particular color at one or more pixel locations in the input images. For example, shared buffers between the video pipeline module 156 and/or the CNN module 150' may enable information sharing between components of the processors 106a-106n. The color detection process may be used to extract features from the training data 352a-352n.

The color detection and/or feature extraction process is generally operational to determine a color likelihood value that pixels in each pixel location of an input image (e.g., the training data 352a-352n during training and/or input video frames) have a specific color. In various embodiments, the specific color may be the shade of yellow used in streets and highways to identify the center and/or edges of traffic lanes and/or other road marks. In other embodiments, the specific color may be the shade of white used on the streets and highways for similar reasons. Generally, the specific color may be any color commonly applied to roadway markings, traffic lights and/or traffic signs.

The color feature extraction may also detect colors that are commonly associated with pavement repair, such as black asphalt. A result of the color feature extraction may be a set of multiple (e.g., 16) features for each pixel of interest. The input image is typically generated by warping an original image taken by an on-dash mounted camera (e.g., the capture device 102a and/or the lens 112a) through an inverse perspective mapping.

The CNN module 150' may implement a color classification operation. The color classification operation may determine a color likelihood value for one or more pixel locations in the input images. The color likelihood values generally define a probability that a particular pixel location is approximately similar to or matches the specified color (e.g., red, green, yellow or white). The results of the color classification operation may be arrays (or probability maps) of color likelihood values that indicates a confidence in the color at each pixel location. In some embodiments, pixel locations different from the specified color may be segmented out of the map by applying a threshold to each color likelihood value. For example, the color likelihood values below a threshold (e.g., pixels below the top N % classification probability) may be set to a default probability value (e.g., zero).

In some embodiments, the feature extraction window 362 may be considered by the color detection process on one of the layers 360a-360b. The feature extraction window 362 may consider a pixel of interest. In an example, the pixel of interest may be a current pixel location being color classified. The feature extraction window 362 may generally represent a local context and contrast around the pixel of interest.

The pixels of the training data 352a-352n may each be represented as components in multiple color channels. In some designs, the color channels may include a luminance channel (e.g., A) and two chrominance channels (e.g., B and C). In various embodiments, the channels ABC may be representative of YUV, YCbCr, YPbPr, RGB, sRGB or YIQ color models. Other color models may be implemented to meet the design criteria of a particular application.

In various embodiments, the CNN module 150' may implement a common Adaboost classifier technique. Specifically, the Adaboost classifier technique combines multiple (e.g., Z) weak depth-two decision trees in a cascade to form a strong classifier. During training, each node of the weak classifiers may select one of the Z features that best separates training samples of different categories. The determination process may generate the color likelihood values that indicate a confidence in the color at each pixel location. Other classifier techniques may be implemented to meet the design criteria of a particular application.

The CNN module 150' generally provides a feature descriptor technique with multiple (e.g., 16) discriminative features that may be efficiently computed. When combined with the Adaboost classifier process, the feature descriptor may achieve good object (e.g., lane marking detection) and color classification accuracy. The simplicity and efficiency of the color detection technique may be well suited for embedded environments and time-critical applications, such as self-driving car. The color detection method is generally a learning-based solution trained off-line from tens of thousands of images, taken under many different scenarios and lighting conditions, and annotated by human experts for lane markings, and is therefore robust.

Using fleet learning, the CNN module 150' may generate one or more reference video frames 300. The reference video frame 300 may comprise masks and/or categorized instances of the reference objects 310. The reference objects 310 may be objects that have been sufficiently defined to enable reliable recognition using computer vision.

The processors 106a-106n may generate images that provide better image processing that allows "seeing" objects in very challenging environments (e.g., very dark and/or bright sun into the camera). The processors 106a-106n may provide hardware acceleration that allows operating on higher resolution and/or running more sophisticated computer vision techniques. High resolution video and sophisticated computer vision operating in real time are relevant to in-cabin use cases. The computer vision operations performed by the CNN module 150' may determine a size, shape, orientation and/or arrangement of a recognized object.

By analyzing a number of video frames in sequence, the computer vision operations performed by the CNN module 150' may determine a trajectory of a recognized object. The computer vision operations may be configured to analyze and/or understand (e.g., interpret, translate, etc.) the digital video to extract and/or produce numerical and/or symbolic information about the digital video. The numerical and/or symbolic information may enable other components to interpret the visual information analyzed by the CNN module 150'.

Figure 6:
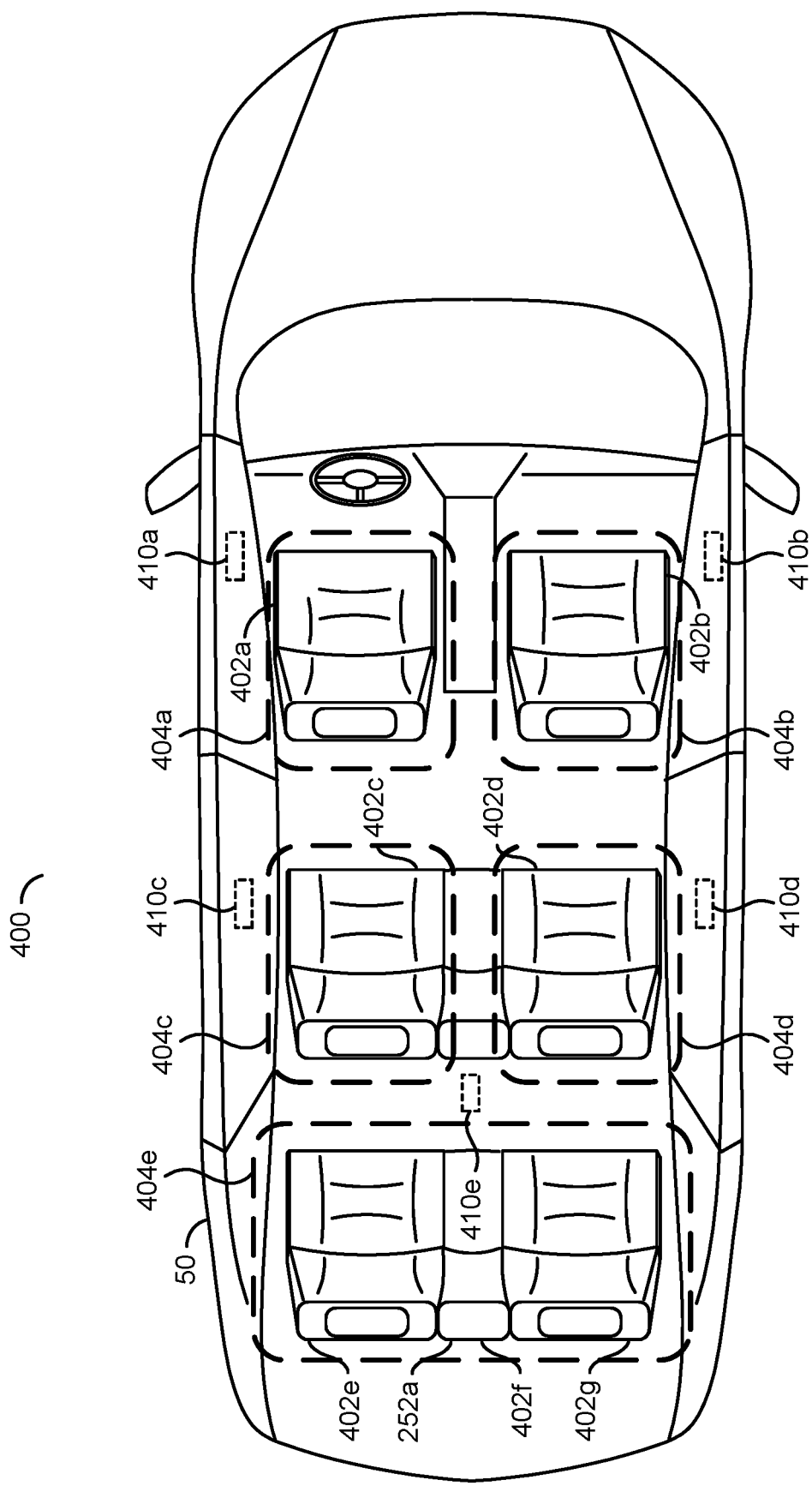
FIG. 6 is a diagram illustrating example climate zones in a vehicle interior.

Referring to FIG. 6, a diagram illustrating example climate zones in a vehicle interior is shown. A top down view 400 of the ego vehicle 50 is shown. The top down view 400 may comprise a cutaway view of the ego vehicle 50 to show the interior of the ego vehicle 50. The cutaway of the ego vehicle 50 in the top down view 400 may illustrate the arrangement of the seats within the ego vehicle 50. In the example shown, the ego vehicle 50 may be a van or SUV type vehicle with three rows of seats. However, the type of vehicle and/or the number of rows of seats within the ego vehicle 50 may be varied according to the design criteria of a particular implementation.

Seats 402a-402g are shown within the ego vehicle 50. The seat 402a may be a driver seat. The seat 402b may be a front passenger seat. The seats 402c-402d may be middle row passenger seats. The seats 402e-402g may be rear passenger seats. In the example shown the seats 402e-402g may be a single bench seat (e.g., the seat row 252a) having three seat belts to enable three passengers to sit in the seats 402e-402g. In the example shown, the ego vehicle 50 may comprise seven seats. The ego vehicle 50 may comprise any number of seats (e.g., generally referred to as the seats 402a-402n, not shown). The number and/or arrangement of the seats 402a-402n may be varied according to the design criteria of a particular implementation.

Dotted boxes 404a-404e are shown. The dotted boxes 404a-404e may represent climate zones within the ego vehicle 50. In the example shown, the climate zone 404a may correspond to the seat 402a, the climate zone 404b may correspond to the seat 402b, the climate zone 404c may correspond to the seat 402c, the climate zone 404d may correspond to the seat 402d and the climate zone 404e may correspond to the bench seat 252a (e.g., the climate zone 404e may comprise the seats 402e-402g). In the example shown, the ego vehicle 50 may comprise five climate zones. However, any number of climate zones may be implemented (e.g., generally referred to as the climate zones 404a-404n, not shown). The number, shape, size and/or arrangement of the climate zones 404a-404n may be varied according to the design criteria of a particular implementation.

Locations of the climate zones 404a-404n may generally correspond with the locations of the seats 402a-402n. In some embodiments, there may be one of the climate zones 404a-404n for each one of the seats 402a-402n. In some embodiments, there may be fewer of the climate zones 404a-404n than the number of the seats 402a-402n (e.g., the climate zone 404e comprises the three seats 402e-402g). In some embodiments, there may be more of the climate zones 404a-404n than the number of seats 402a-402n (e.g., one of the seats 402a-402n may have multiple of the climate zones 404a-404n). In some embodiments, the locations of the climate zones 404a-404n may not overlap with each other.

The climate zones 404a-404n may be locations (e.g., an area, an amount of three-dimensional space, etc.) within the ego vehicle 50. The climate zones 404a-404n may have independently controlled climate settings (environmental variables). The climate settings of each of the climate zones 404a-404n may be independently controlled in response to the climate control signal VCTRL generated by the processors 106a-106n. In an example, the climate settings for each of the climate zones 404a-404n may comprise a target air temperature, a fan speed (e.g., amount of airflow of a fan), an amount of seat warming (e.g., a seat temperature), an amount of seat massaging (e.g., an intensity of vibration), a status of a vehicle window, audio volume level, seat position, seat recline, etc. Each of the climate zones 404a-404n may be set to have different climate settings. However, not every one of the climate zones 404a-404n has to have different climate settings (e.g., two or more of the climate zones 404a-404n may be set to have the same climate settings). While the climate zones 404a-404n may be independently controlled, one or more of the climate settings may be affected by the climate settings in another of the climate zones 404a-404n (e.g., a volume level of one climate zone may affect other climate zones). Generally, target values for each of the climate settings may be set for each of the climate zones 404a-404n. The number of climate settings and/or the range/resolution of settings for each of the climate settings for each of the climate zones 404a-404n may be varied according to the design criteria of a particular implementation.

Dotted boxes 410a-410e are shown. The dotted boxes 410a-410e may represent one or more blocks (or circuits). The circuits 410a-410e may comprise one or more of the actuators 116. The circuits 410a-410e may be climate controller circuits. In the example shown, the climate controller 410a may correspond to the climate zone 404a, the climate controller 410b may correspond to the climate zone 404b, the climate controller 410c may correspond to the climate zone 404c, the climate controller 410d may correspond to the climate zone 404d and the climate controller 410e may correspond to the climate zone 404e. In the example shown, the ego vehicle 50 may comprise five climate controllers. However, any number of climate controllers may be implemented (e.g., generally referred to as the climate controllers 410a-410n, not shown). The number of the climate controllers 410a-410n implemented may be varied according to the design criteria of a particular implementation.

The climate controller circuits 410a-410n be configured to adjust the climate settings for the climate zones 404a-404n. Generally, the number of climate controller circuits 410a-410n implemented may be the same as the number of the climate zones 404a-404n. In the example shown, the five climate controllers 410a-410e are implemented for the five climate zones 404a-404e (e.g., the climate controller 410a may adjust the climate settings for the climate zone 404a, the climate controller 410b may adjust the climate settings for the climate zone 404b, etc.).

Generally, the number and location of climate zones 404a-404n may be defined based on the locations of the climate controllers 410a-410n. The climate controllers 410a-410n may enable the independent adjustment of the climate settings in the climate zones 404a-404n. The location, size and/or shape of the climate zones 404a-404n may correspond to the coverage and/or range of the climate settings adjusted by the climate controllers 410a-410n. In an example, the climate settings adjusted by the climate controller 410a may be configured to adjust the temperature in the climate zone 404a having a size to cover the area of the seat 402a. In another example, the climate settings adjusted by the climate controller 410e may be configured to adjust the temperature in the climate zone 404e having a size to cover the area of the seats 402e-402g.

In the example shown, the climate controllers 410a-410e are each illustrated as a dotted box in a single location. However, the climate controllers 410a-410n may comprise various components and/or various types of the actuators 116. Each of the actuators 116 of each climate controller 410a-410n may be implemented at different locations within or near the corresponding one of the climate zones 404a-404n (e.g., the climate controllers 410a-410n may be spread throughout the corresponding one of the climate zones 404a-404n). The climate controllers 410a-410n may be located in different areas near or within the climate zones 404a-404n. The multiple actuators 116 implemented by the climate controllers 410a-410n may enable the adjustment of the climate settings. In one example, the climate controllers 410a may comprise a speaker (e.g., to adjust volume levels), a fan (to adjust airflow), a heating element (e.g., to increase air temperature), a vent (e.g., to enable cooled air to blow), a seat warmer (e.g., to adjust a seat temperature), a motor (e.g., to move a window, enable a chair massage, adjust an intensity of vibration of a chair massage, etc.), etc. The types of actuators 116 and/or the number of different actuators 116 used to implement the various climate controllers 410a-410n may be varied according to the design criteria of a particular implementation.

Figure 7:
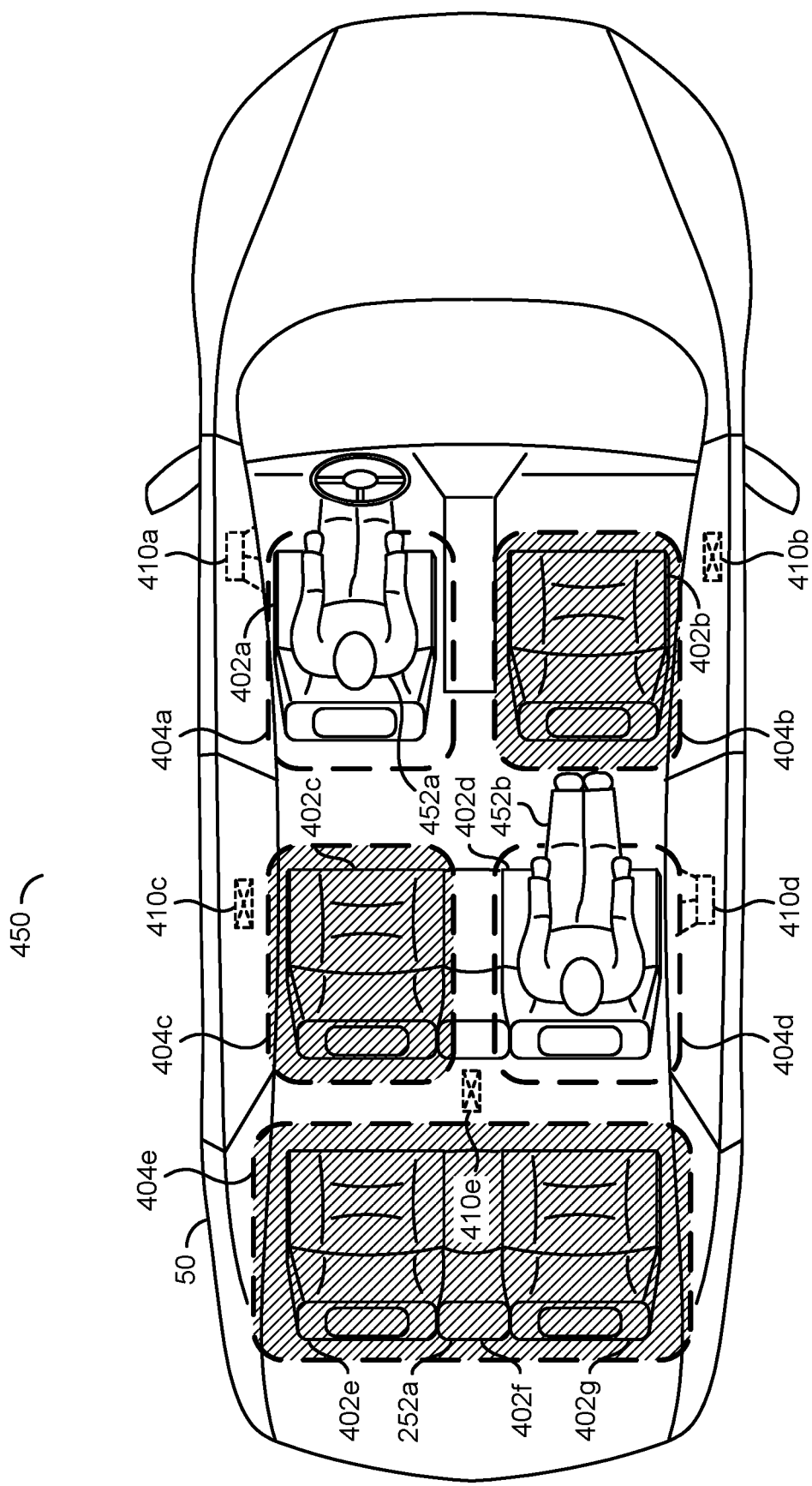
FIG. 7 is a diagram illustrating efficiently adjusting climate settings in climate zones based on passenger occupancy.

Referring to FIG. 7, a diagram illustrating efficiently adjusting climate settings in climate zones based on passenger occupancy is shown. A top down view 450 is shown. The top down view 450 may provide a cutaway view showing the interior of the ego vehicle 50 similar to the view 400 shown in association with FIG. 6. The ego vehicle 50, the seats 402a-402n, the climate zones 404a-404e and/or the climate controllers 410a-410e are shown.

Passengers 452a-452b are shown. The passenger 452a is shown seated in the seat 402a. The passenger 452a may be the driver 202. The passenger 452b is shown seated in the seat 402d. In the example shown, only two passengers are within the ego vehicle 50. However, any number of passengers may be within the ego vehicle 50 (e.g., generally referred to as the passengers 452a-452n, not shown). The two passengers 452a-452b are shown as an illustrative example for adjusting the climate zones 404a-404e in response to some of the seats 402a-402e being occupied and some of the seats 402a-402e being unoccupied. Embodiments of the invention 100 may be applicable to any number and/or arrangement of the passengers 452a-452n within the ego vehicle 50.

The passenger 452a may be within the climate zone 404a. The passenger 452b may be within the climate zone 404d. In the example shown, there are no passengers within the climate zone 404b, the climate zone 404c and the climate zone 404e. In the top down view 450, the climate zone 404b, the climate zone 404c and the climate zone 404e are shown shaded. The shaded climate zones 404b, 404c and 404e may represent an empty climate zone and/or a climate zone that has been powered down (e.g., the corresponding one of the climate controllers 410a-410n may be powered down) to conserve energy.

The CNN module 150 may be configured to detect objects. The objects detected by the CNN module 150 may comprise the seats 402a-402n and/or the passengers 452a-452n. The decision module 158 may be configured to determine the location of the passengers 452a-452n (e.g., determine which seat each passenger is located in and/or which climate zone the passenger is located in). Based on the location of the detected passengers 452a-452n and/or the locations of the seats 402a-402n, the decision module 158 may determine which of the climate zones 404a-404n are occupied by one or more of the passengers 452a-452n. The processors 106a-106n may be configured to correlate the location of each of the detected passengers 452a-452n to the climate zones 404a-404n.

Each vehicle that the apparatus 100 is implemented in may have a different number, size and/or locations for the climate zones 404a-404n. The processors 106a-106n may be configured to have pre-existing knowledge of the interior of the ego vehicle 50 and/or the locations (and boundaries) of the climate zones 404a-404n. In an example, the memory 108 may store the locations of the climate zones 404a-404n.

In some embodiments, the locations of the climate zones 404a-404n may be input (e.g., pre-configured) by the manufacturer of the ego vehicle 50. In some embodiments, the locations of the climate zones 404a-404n may be determined based on the specifications of the climate controllers 410a-410n (e.g., range, power output, etc.). In some embodiments, the locations of the climate zones 404a-404n may be user-defined. How the locations of the climate zones 404a-404n are determined may be varied according to the design criteria of a particular implementation.

The processors 106a-106n may be configured to compare the determined locations of the detected passengers 452a-452n to the locations of the climate zones 404a-404n. Based on the comparison of the determined locations of the passengers 452-452n detected using the computer vision object detection, the processors 106a-106n may determine which of the climate zones 404a-404n are occupied and which of the climate zones 404a-404n are not occupied.

The processors 106a-106n may generate the signal VCTRL in response to determining that one of the climate zones 404a-404n is occupied or unoccupied. The signal VCTRL may be configured to provide power and/or control signals to the climate controllers 410a-410n. When the processors 106a-106n determine that one of the climate zones 404a-404n is not occupied, then the signal VCTRL may be generated to power down the corresponding one of the climate controllers 410a-410n. When the processors 106a-106n determine that one of the climate zones 404a-404n is occupied, then the signal VCTRL may be generated to power on the corresponding one of the climate controllers 410a-410n and/or adjust the corresponding one of the climate controllers 410a-410n to particular settings for the climate settings. Powering down the climate controllers 410a-410n may conserve power in the ego vehicle 50 (e.g., each of the fans blowing cooled air may consume energy). Adjusting the climate controllers 410a-410n individually when passengers are present may enable granular settings within the ego vehicle 50 for each of the passengers 452a-452n.

In the example shown, the processors 106a-106n may detect the passenger 452a and determine that the passenger 452a is within the climate zone 404a. The processors 106a-106n may generate the signal VCTRL to activate and/or control the climate controller 410a (e.g., the climate controller 410a is shown enabled).

In the example shown, the processors 106a-106n may detect that no passenger is within the climate zone 404b. The processors 106a-106n may generate the signal VCTRL to deactivate the climate controller 410b (e.g., the climate controller 410b is shown as inactive).

In the example shown, the processors 106a-106n may detect that no passenger is within the climate zone 404c. The processors 106a-106n may generate the signal VCTRL to deactivate the climate controller 410c (e.g., the climate controller 410c is shown as inactive).

In the example shown, the processors 106a-106n may detect the passenger 452b and determine that the passenger 452b is within the climate zone 404d. The processors 106a-106n may generate the signal VCTRL to activate and/or control the climate controller 410d (e.g., the climate controller 410d is shown enabled).

In the example shown, the processors 106a-106n may detect that no passenger is within the climate zone 404e. The processors 106a-106n may generate the signal VCTRL to deactivate the climate controller 410e (e.g., the climate controller 410e is shown as inactive).

The processors 106a-106n may continually (or periodically) perform the computer vision operations to detect the passengers 452a-452n. The processors 106a-106n may be configured to generate the signal VCTRL as the passengers 452a-452n move into and out of the climate zones 404a-404n. The signal VCTRL may be generated to update (e.g., enable, disable, adjust, etc.) the climate controllers 410a-410n as the occupancy status of the climate zones 404a-404n change. In an example, the signal VCTRL may be generated in response to passengers entering and exiting the ego vehicle 50 (e.g., when the ego vehicle 50 is a taxi and/or part of a ride-sharing service, passengers may often exit and enter the ego vehicle 50, which changes the occupancy status of the climate zones 404a-404n).

In an example, if the passenger 452b moves from the seat 402d to the seat 402g, the processors 106a-106n may detect that the climate zone 404d has become empty. The processors 106a-106n may detect the passenger 452b and determine that the location of the passenger 452b is in the seat 402g and that the seat 402g is within the climate zone 404e. The processors 106a-106n may detect that the climate zone 404e has become occupied. In an example, the processors 106a-106n may generate the signal VCTRL to power down the climate controller 410d and generate the signal VCTRL to activate and/or control the climate controller 410e.

In the example shown, the climate zone 404e may comprise the three seats 402e-402g. When one or more of the occupants 452a-452n are detected in any of the seats 402e-402g, the processors 106a-106n may determine that the climate zone 404e is occupied. In an example, if the passenger 452b moves to any of the seats 402e-402g, then the processors 106a-106n may detect that the location of the passenger 452b corresponds to the climate zone 404e and the signal VCTRL may be presented. In another example, if the passenger 452a moves to the seat 402e and the passenger 452b moves to the seat 402f, then the processor 106a-106n may determine that the location of the passengers 452a-452b is within the climate zone 404e and the signal VCTRL may be presented. If the passenger 452b moves from the seat 402f to the seat 402g then no change to the climate settings and/or the powered on/off status of the climate controller 410e may be performed.

Since the climate zone 410e may comprise more than one of the passengers 452a-452n, granular settings for the seats 402e-402g may not be available. For example, one set of preferences for the climate settings for the climate zone 404e may be implemented.

Figure 8:
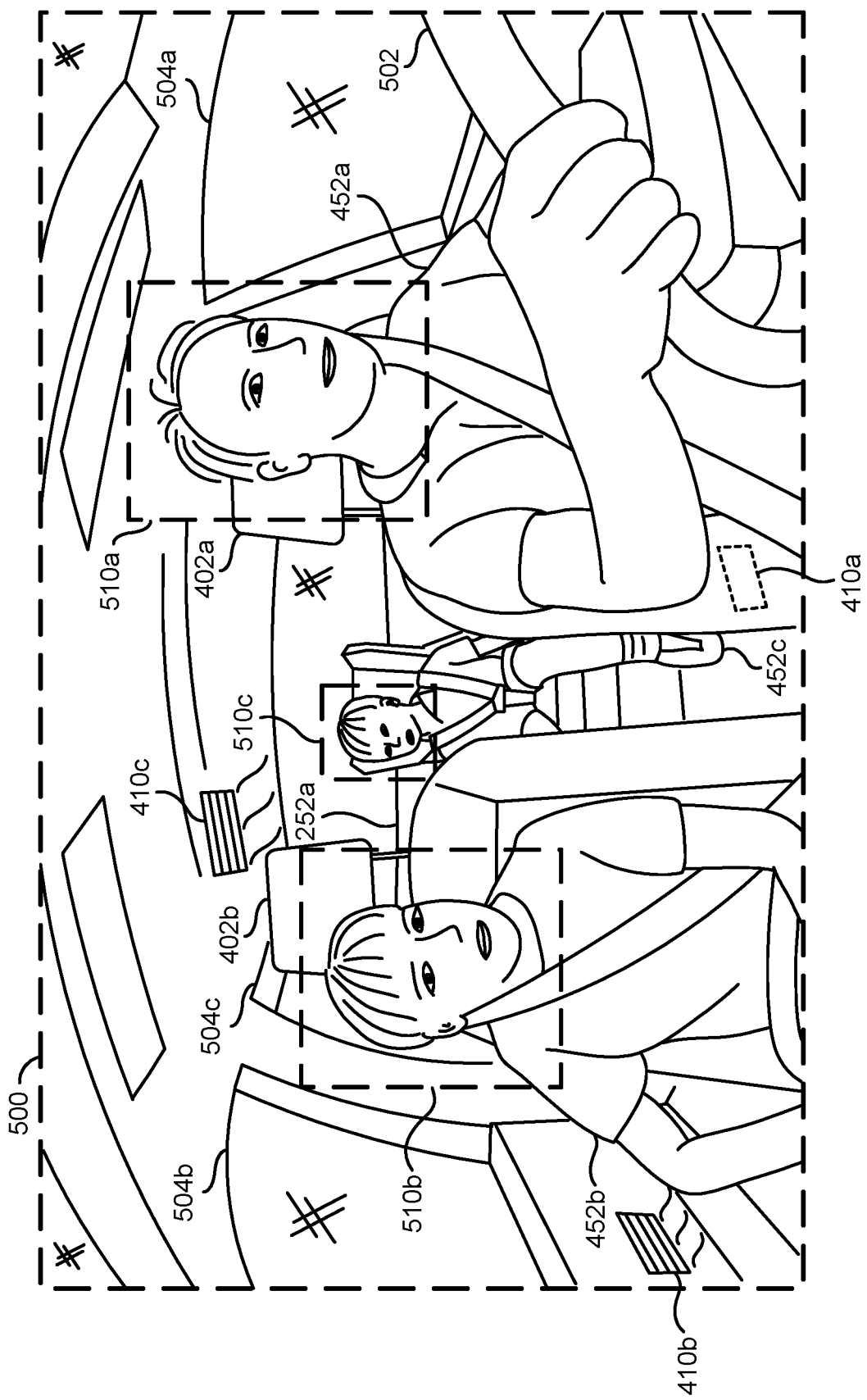
FIG. 8 is a diagram illustrating an example of a processor analyzing characteristics of passengers in a vehicle cabin.

Referring to FIG. 8, a diagram illustrating the processors 106a-106n analyzing characteristics of passengers in a video frame of a vehicle cabin is shown. A video frame 500 is shown. The video frame 500 may be a video frame captured by one or more of the capture devices 102a-102n of the interior of the vehicle 50. In one example, the lens 112a of the capture device 102a may implement a wide angle lens configured to capture a wide angle field of view of the interior of the vehicle 50. For example, the processors 106a-106n may be configured to perform video de-warping operations on potential distortions caused by the wide angle lens 112a before performing the computer vision operations. In another example, the video frame 500 may be created by stitching together video frames captured at the same time by more than one of the capture devices 102a-102n. For example, the processors 106a-106n may be configured to perform video stitching operations to combine multiple video frames together in order to generate the video frame 500 before performing the computer vision operations. Capturing a wide angle view and/or generating a stitched view of the interior of the vehicle 50 may enable the processors 106a-106n to analyze a view showing more than one of the occupants 452a-452n of the vehicle 50. The method of capturing the wide angle video frame 500 may be varied according to the design criteria of a particular implementation.

In the example video frame 500, a number of occupants 452a-452c are shown. For example, the driver 452a is shown in the driver seat 402a, the passenger 452b is shown in the passenger seat 402b and the occupant 452c is shown in a seat in the back row 252a (e.g., a bench seat comprising the seats 402e-402g as shown in association with FIG. 7). The CNN module 150 may be configured to detect various objects in the video frame 500. In an example, the computer vision operations may detect a steering wheel 502 (or other features of the interior of the vehicle 50). In another example, the computer vision operations may detect the driver seat 402a, the passenger seat 402b and/or the back row bench seat 252a. In some embodiments, the processors 106a-106n may determine whether the occupant 452a or 452b is the driver 202 in response to the detected location of the steering wheel 502 (e.g., left side steering wheel or right side steering wheel).

Climate controllers 410a-410c are shown. The climate controllers 410a-410c may be representative examples of the actuators 116 that may be used to adjust the climate settings in each of the climate zones 404a-404n. In the example shown, the climate controller 410a may be a device used to implement seat warming and/or seat massaging for the seat 402a (e.g., in the climate zone 404a). In the example shown, the climate controller 410b may be an air vent configured to release hot or cool air towards the seat 402b (e.g., in the climate zone 404b). In the example shown, the climate controller 410c may be an air vent configured to release hot or cool air towards the rear bench 252a (e.g., in the climate zone 404e). Each of the climate zones 404a-404n may have more than one actuator 116 for implementing the climate controllers 410a-410n. For example, the driver 452a may be in the climate zone 404a, and the climate zone 404a may comprise the seat warmer, a seat massager, air vents to adjust an air temperature, speakers, etc. as the climate controller 410a.

Vehicle windows 504a-504c are shown in the interior of the vehicle 50. The window 504a may be the driver side window. The window 504b may be the passenger side window. The window 504c may be the rear passenger window. In the example shown, windows 504a-504c are visible. However, any number of windows may be implemented within the ego vehicle 50 (generally referred to as the windows 504a-504n, not all shown). Based on the location of the seats 402a-402n in the ego vehicle 50, the seats 402a-402n (and/or the bench 252a) may be associated with one or more of the windows 504a-504n. In the example shown, the window 504a may be associated with the seat 402a, the window 504b may be associated with the seat 402b and the window 504c may be associated with the bench seat 252a.

In some embodiments, the processors 106a-106n may associate the windows 504a-504n with the seats 402a-402n (and/or the bench seat 252a) to determine a location of the passengers 452a-452n and/or which of the climate zones 404a-404n the detected passengers 452a-452n are currently occupying. In an example, the passenger 452b may be detected near the window 504b and the processors 106a-106n may use the detection of the passenger 452b near the window 504b to determine that the passenger 452b is in one of the climate zones 404a-404n that comprises the window 504b (e.g., the climate zone 404b shown in association with FIG. 7). The processors 106a-106n may determine which of the climate zones 404a-404n to adjust the climate settings for and/or which of the climate zones 404a-404n to power down to conserve energy based on which of the windows 504a-504n the passengers 452a-452n are sitting near.

In some embodiments, the windows 504a-504n may be used to adjust the climate settings. For example, the actuators 116 implemented by the climate controllers 410a-410n may be configured to open and close the windows 504a-504n. For example, if the window 504b is in the climate zone 404b that is occupied by the passenger 452b, then the climate controller 410b may open the window to increase airflow and/or decrease temperature to the climate zone 404b. In another example, the preferences of the passenger 452b may be to close the window 504b to prevent disturbances caused by wind blowing in the window 504b when open.

The boxes 510a-510c are shown. The boxes 510a-510c may be a detected object and/or group of objects representing faces, body parts and/or heads detected by the processors 106a-106n. For example, the face 510a may correspond to the occupant 452a, the face 510b may correspond to the occupant 452b and the face 510c may correspond to the occupant 452c. In the example shown, the objects 510a-510c may be faces of the occupants 452a-452c, however the computer vision operations performed by the processors 106a-106n may analyze and/or characterize any combination of body parts of the occupants 452a-452c to determine the a class (or status) of the occupants 452a-452c and/or identify the occupants 452a-452c as a particular individual (e.g., perform an identification using facial recognition).

The processors 106a-106n may be configured to detect the seats 402a-402b and/or the bench seat 252a and/or other objects of the interior of the vehicle 50. The processors 106a-106n may be configured to associate a location of the occupants 452a-452c with the seats 402a-402b and/or the bench seat 252a. The location of the occupants 452a-452c may be cross-referenced with the location(s) of the climate zones 404a-404n. For example, the processors 106a-106n may store the location of the climate zones 404a-404n of the vehicle 50 with respect to the objects in the ego vehicle 50 such as the locations of the seats 402a-402b and/or the bench seat 252a.

The processors 106a-106n may be configured to determine the age of the occupants 452a-452c based on the faces 510a-510c (e.g., facial features) and/or other characteristics of the occupants 452a-452c determined by the CNN module 150 (e.g., a body size, body proportions, etc.). The processors 106a-106n may be configured to determine a location of the seats 402a-402b and/or the bench seat 252a. The processors 106a-106n may be configured to determine the location of the occupants 452a-452c within the cabin of the vehicle 50.

In one example, 3D co-ordinates of the body of the occupants 452a-452c may be determined (e.g., by determining a horizontal co-ordinate, a vertical co-ordinate and/or a depth co-ordinate for each occupant 452a-452n with respect to the lens 112a of the capture device 102a). In another example, various objects within the vehicle 50 may be used to provide a location of the occupants 452a-452c (e.g., a location of the seats 402a-402b and/or the bench 252a, a location of the steering wheel 502, distance from the windows 504a-504n and/or side panels, etc.). In yet another example, the sensor fusion module 152 may be configured to analyze input from the vehicle sensors 114 to perform sensor fusion operations (e.g., cross-reference a location determined based on the computer vision operations with weight sensors located in the seats 402a-402b and/or the bench 252a, perform a comparison based on LIDAR, perform a comparison based on radar detection, etc.). In still another example, the locations of various objects may be determined based on 3D positioning using a stereo pair of cameras (e.g., the video frame 500 may be one of a stereo pair of video frames captured by two of the capture devices 102a-102n implemented as a stereo pair).

Locations may be further determined based on a monocular view (e.g., a monocular view may not provide an accurate result, but a high accuracy might not be necessary since the occupants 452a-452c may only need to be associated with the locations of the climate zones 404a-404n, which may be relatively large areas of space). Based on the characteristics of the occupants 452a-452c, the locations of the climate zones 404a-404n and the climate zones 404a-404n that the occupants 452a-452c are sitting in, the processors 106a-106n may determine whether to adjust or power down the climate settings for each of the climate zones 404a-404n.

In the example video frame 500, the occupant 452a may be an adult driver. The computer vision operations may determine that the face 510a has characteristics corresponding to an adult male (e.g., adult facial features). The computer vision operations may further determine that the body of the occupant 452a is the body of an adult male (e.g., the body is tall relative to the seat 402a, the head 510a reaches the headrest of the seat 402a, the arms are not reaching up to touch the steering wheel 502, the size of the head 510a is small in proportion to the body, etc.). The processors 106a-106n may perform the computer vision operations to detect the location of the seat 402a (e.g., detect the driver seat in the front row 252c). In some embodiments, the locations of the seats 402a-402n and/or the locations of the climate zones 404a-404n may be pre-defined information stored in the memory 108 (e.g., based on location co-ordinates relative to the location of the capture device 102a that may be initialized by a vehicle manufacturer).

The processor 106a-106n may compare the determined characteristics of the occupant 452a with classification thresholds for the driver seat 402a. In one example, each of the climate zones 404a-404n may have particular thresholds for various classifications of the passengers 452a-452n. In another example, all the climate zones 404a-404n may have the same thresholds for the various classifications of the passengers 452a-452n. The classification thresholds may comprise pre-determined values for particular characteristics of the occupants 452a-452n. In one example, the classification threshold may comprise an age limit (e.g., a person over the age of 16) and the age limit may be compared to an age of the passengers 452a-452c determined by analyzing the faces 510a-510c. In another example, the classification threshold may comprise a species of the occupants 452a-452n (e.g., different climate settings may be applied if the occupant is a person, or if the occupant is a dog, or if the occupant is a cat, etc.). The types of classification thresholds may be varied according to the design criteria of a particular implementation.

The classification thresholds may be implemented to provide limitations to the adjustments that the processors 106a-106n may make to the climate settings. For example, limitations may be placed on the maximum and minimum amount that the temperature may be set to in the climate zones 404a-404n if the climate zone is occupied by a young child or a baby (e.g., a limitation that may not be imposed for an adult). The types of limitations that may be applied to the climate settings may be varied according to the design criteria of a particular implementation.

In the example video frame 500, the occupant 452b may be a child passenger. The computer vision operations may determine that the face 510b has characteristics corresponding to a child (e.g., pre-teen facial features). The computer vision operations may further determine that the body of the occupant 452b is the body of a young male below the age of 12 (e.g., the body is small relative to the seat 402b, the head 510b does not reach the headrest of the seat 402b, the size of the head 510b is large in proportion to the body, etc.). The processors 106a-106n may perform the computer vision operations to detect the location of the seat 402b (e.g., detect the passenger seat in the front row 252c). The processor 106a-106n may compare the determined characteristics of the occupant 452b with the classifications and the thresholds that correspond to the classifications (e.g., a person over the age of 12, whether the person is recognized as a particular person, etc.). Since the passenger 452b is child (e.g., under the age of 12), the passenger 452b may be classified as a child (e.g., the classification threshold may be an age of 12 years old or older) and a limitation may be placed on how cool the climate zone 404b may be set.

The processors 106a-106n may detect the presence of the occupant 452b and that the location of the occupant 452b is in the front passenger seat 402b. The front passenger seat 402b may be associated with the passenger window 504b (e.g., due to the proximity of the seat 402b to the window 504b). The processors 106a-106n may correlate the location of the occupant 452b with the boundaries of the climate zones 404a-404n. For example, the processors 106a-106n may determine that the location of the passenger 452b is in the climate zone 404b based the seat 402b being within the climate zone 404b. The processors 106a-106n may detect the face 510b of the occupant 452b and determine the age of the occupant 452b (e.g., based on the facial characteristics and/or other characteristics of the body of the occupant 452b). The processors 106a-106n may check the determined age of the occupant 452b against the information in the memory 108 (e.g., the classification threshold for age). Since the child is under the age of 12 (e.g., below the threshold age for temperature settings), the processors 106a-106n may generate the signal VCTRL'. In response to the signal VCTRL', the climate controller 410b may adjust the temperature of the climate zone 404b, but limit the amount of adjustment due to the age of the passenger 452b.

In the example video frame 500, the occupant 452c may be a toddler. The computer vision operations may determine that the face 510c has characteristics corresponding to a toddler and/or a baby (e.g., very young facial features). The computer vision operations may further determine that the body of the occupant 452c is the body of an infant male below the age of 6 (e.g., the body is small relative to the seat 252a, the size of the head 510c is very large in proportion to the body, the feet of the occupant 452c do not reach the floor, etc.). The processors 106a-106n may perform the computer vision operations to detect the location of the seat 252a (e.g., detect the seat as a bench for the back row 252a). The processors 106a-106n may compare the determined characteristics of the occupant 452c with the classification thresholds for a young child (e.g., a person under the age of 6).

Since the passenger 452c is an infant (e.g., under the age of 6), the passenger 452c may meet the criteria for limitations of the adjustment to the climate settings. Since the occupant 452c is on the back bench seat 252a, the passenger 452c may be determined to be in the climate zone 404e (shown in association with FIG. 7) that comprises multiple seats. In an example, if other of the occupants 452a-452n are also seated on the back bench 252a (e.g., in the same climate zone 404e as the infant passenger 452c) there may be additional classification thresholds that the processors 106a-106n may consider. For example, one passenger in the climate zone 404e may be older than 12 (e.g., and the limitation to the climate settings based on age would not apply) and the other passenger in the climate zone 404e may be younger than 6 (e.g., and the limitation to the climate settings based on age would apply).

When multiple passengers 452a-452n are within the same one of the climate zones 404a-404n, the limitations to the climate settings may be applied even if only one of the passengers meets the classification threshold. For example, the limitations to the climate settings may be implemented to protect a potentially vulnerable class of passengers, so the processors 106a-106n may impose the limitation even if other passengers in the climate zone do not qualify for the limitation. In the example shown, even if an adult passenger sits next to the infant passenger 452c in the climate zone 404e, the limitation to the temperature due to the age of the infant passenger 452c would still apply.

The processors 106a-106n may be configured to determine the approximate age of the occupants 452a-452n and/or an associated confidence level indicating the determination of the age. The confidence level may represent a likelihood that the age determined is correct. In some scenarios, the age of the occupants 452a-452c may be difficult to determine and/or the age of the occupants 452a-452c may be close to the classification threshold. For example, the child 452b may appear to be approximately 12 years old (e.g., right at the age classification threshold). In another example, the child 452b may be 14 years old but have a younger appearance. In still another example, the child 452b may be 11 years old but appear older than 12. In some embodiments, when the age is difficult to determine with respect to the age classification threshold, the processors 106a-106n may impose the climate setting limitations for the particular class (e.g., limit the amount of cooling as per the lower age group).

In some embodiments, the limitations to the climate settings may not be imposed automatically. For example, if the child 452b is determined to be under 12 years old, the processors 106a-106n may be configured to provide a prompt on an infotainment system touchscreen display and/or provide an audio message that tells the driver 452a that the passenger 452b is 12 years old or younger and the climate settings should not be adjusted beyond a particular amount. The driver 452a would then be able to decide whether to impose the limitation to the climate settings or not. In some embodiments, when the processors 106a-106n cannot confidently determine the age of the occupants 452b-452c, the processors 106a-106n may generate a message (e.g., audio using the vehicle speakers or video using the touchscreen display) asking if the occupants 452b-452c are below the threshold age. One of the occupants 452a-452c may respond to the prompt and the processors 106a-106n may perform the adjustment to the climate settings based on the response to the prompt. For example, if one of the occupants 452a-452c confirms that the age of the occupant 452b is younger than 12 years old, then the processors 106a-106n may provide the signal VCTRL' that limits the amount of adjustment to the climate settings based on the limitation to the climate settings for the class of occupants that are under the age of 12 years old.

Figure 9:
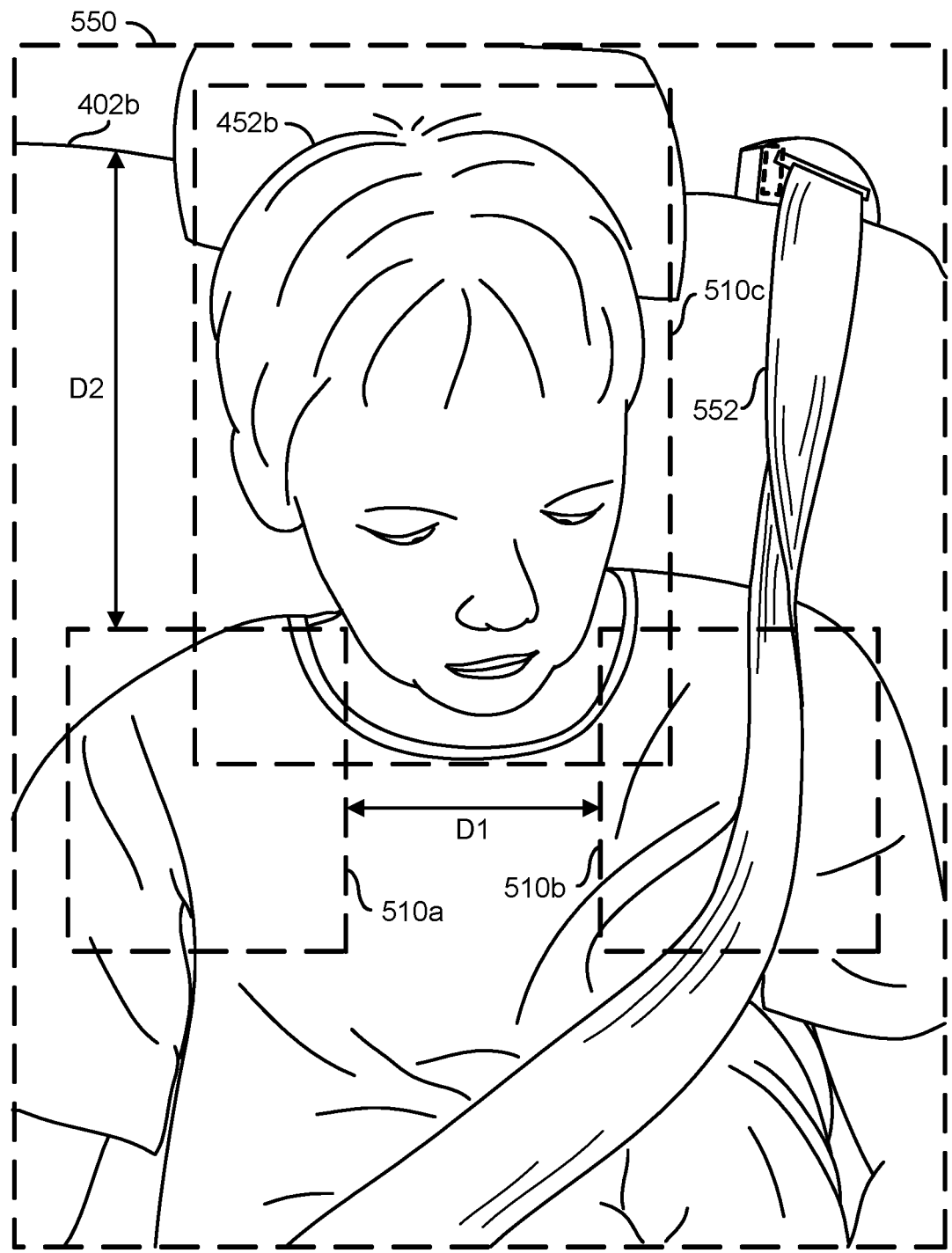
FIG. 9 is a diagram illustrating a processor determining characteristics of an occupant.

Referring to FIG. 9, a diagram illustrating the processors 106a-106n determining characteristics of an occupant is shown. An example video frame 550 is shown. The example video frame 550 may be one of the video frames FRAMES_A-FRAMES_N captured using one of the capture devices 102a-102n directed at the seat 402b of the vehicle 50. The occupant 452b is shown in the seat 402b. The seatbelt 552 is shown worn by the occupant 452b. In the example shown, one occupant 452b in one seat 402b is shown being analyzed using the computer vision operations. However, the apparatus 100 may be configured to detect numerous seats (e.g., seats 402a-402n, not shown) and/or occupants (e.g., occupants 452a-452n, not shown) for the entire interior of the vehicle 50. While only one occupant and/or seat is shown for illustrative purposes, aspects of the invention 100 may be similarly applicable and/or performed for each of the seats 402a-402n and/or occupants 452a-452n (e. g., for each of the climate zones 404a-404n).

The CNN module 150 may analyze the video frame 550 to determine the characteristics of the occupant 452b. Boxes 510a-510c are shown in the video frame 550 to represent various body parts of the occupant 452b that may be identified using computer vision. In the example shown in FIG. 9, three body parts (e.g., 510a-510c) are shown as identified by the CNN module 150 (e.g., only three are shown for illustrative purposes). However, the CNN module 150 may identify and/or analyze numerous different body parts (e.g., 510a-510n, not shown). The body parts identified may be varied according to the design criteria of a particular implementation.

The body parts 510a-510n may be used by the processors 106a-106n to determine the characteristics of the occupant 452b. In the example shown, the body parts 510a-510c may be used to determine a size, orientation, position and/or location of the occupant 452b (e.g., relative to the interior of the vehicle 50 and/or relative to the seat 402b). In the example shown, the processors 106a-106n may identify the shoulders 510a-510b of the occupant 452b and/or the head of the occupant 452b. In some embodiments, the computer vision operations may analyze individual body parts and/or the body as a whole.

In the example shown, the box 510a may represent a right shoulder of the occupant 452b and the box 510b may represent a left shoulder of the occupant 452b. The shoulders 510a-510b may represent characteristics of the occupant 452b that have been detected by the processors 106a-106n. A distance D1 is shown between the boxes representing the shoulders 510a-510b. The distance D1 may be used to determine the size and/or width of the occupant 452b. The distance D1 may be illustrative and the determination of the distance D1 may be more accurate than measurements to the boxes 510a-510b shown. For example, the processors 106a-106n may be configured to identify the body parts 510a-510b in the video frame 550 and measure a distance between the body parts 510a-510b. In an example, the distance D1 may be used to determine the characteristics of the occupant 452b to provide one potential source of information for determining an age and/or body size of the occupant 452b.

A distance D2 is shown between the shoulder 510a and the top of the seat 402b. The distance D2 may be used to determine a size of the occupant 452b relative to the seat 402b. The distance D2 may be illustrative and the determination of the distance D2 may be more accurate than measurements to the box 510a shown. In one example, the measurements may be performed at a pixel level. For example, the age and/or body size of the occupant 452b determined by the processors 106a-106n may be based on the location and/or height of the occupant 452b relative to the seat 402b. While one measurement (e.g., D2) is shown relative to the seat 402b, numerous measurements (e.g., width of the body with respect to the seat 402b, a distance from the head 510c to the headrest of the seat 402b, a distance from the left shoulder 510b to the top of the seat 402b, etc.) may be performed by the processors 106a-106n to determine an approximate age and/or body size of the occupant 452b.

The head 510c of the occupant 452b is shown. The CNN module 150 may determine various characteristics of the head and/or face 510c of the occupant 452b (e.g., facial characteristics). In one example, the size and/or shape of the detected face 510c may be compared to the size and/or shape of other faces (e.g., adults and/or children) by the CNN module 150 to approximate an age of the occupant 452b. In another example, the size and/or shape of the detected face 510c may be compared to the size and/or shape of a known face to determine whether there is an identity match (e.g., based on a confidence level threshold). Distances between and/or sizes of various facial features (e.g., eyes, nose, mouth, cheekbones, jaw, chin, eyebrows, forehead, ears, etc.) may be analyzed by the processors 106a-106n and/or compared with statistical data about facial features of people at particular ages. The analysis and/or comparisons performed by the processors 106a-106n may be used to approximate an age of the occupant 452b based on the computer vision operations. The types of analysis performed, the facial features analyzed, the comparisons made and/or the statistical information used for comparison may be varied according to the design criteria of a particular implementation.

In some embodiments, the overall size of the head 510c may be used to determine the age of the occupant 452b. In an example, the size of the head 510c may be compared to the overall size of the body of the occupant 452b. Generally, for a younger person the relative size of the head in proportion to the overall body size may be larger. For example, an adult may have a smaller head in proportion to the overall body size than a child. The processors 106a-106n may be configured to use the detected size of the head 510c as one factor for determining an approximate age of the occupant 452b.

In some embodiments, the processors 106a-106n may determine the age based on secondary sex characteristics. For example, the detection of visible secondary sex characteristics using the computer vision operations may determine if the occupant 452b has reached puberty to help approximate the age (e.g., over the age of 12). In an example, the visible secondary sex characteristics may comprise detecting facial hair, detecting enlarged breasts, detecting widened hips, detecting an enlarged Adam's apple, etc. In another example, the computer vision operations may detect a baby bump indicating that the occupant 452b is pregnant (e.g., to help approximate the age).

The processors 106a-106n may determine the age of the occupant 452b based on an aggregation of various characteristics detected using the computer vision operations performed by the CNN module 150. Statistical weight may be adjusted for various characteristics. For example, a higher confidence level of an accurate detection of particular characteristic may have more statistical weight than a lower confidence level of accurate detection. In another example, particular characteristics may have a higher statistical weight (e.g., to account for particular factors that may provide a better indication of age such as the size of the head). The various factors and/or the statistical weights applied by the processors 106a-106n for each type of factor used for determining the age of the occupant 452b may be varied according to the design criteria of a particular implementation.

The decision module 158 may select appropriate climate settings for the climate zone (e.g., the climate zone 404b) where the occupant 452b is determined to be located in response to the characteristics of the occupant 452b (e.g., the age and/or size of the occupant 452b) determined as a result of the computer vision operations. The appropriate selection may correspond to the characteristics detected. In an example scenario where an adult is detected, the appropriate selection for the climate settings may be to not implement a limitation. In an example scenario where a child is detected, the appropriate selection for the climate settings may be to implement a limitation to the upper/lower values for the adjustment. In another example scenario where no passenger is detected, the appropriate selection for the climate settings may be to disable (e.g., power down) the actuators used as the climate controller 410b.

In one example, the CNN module 150 may detect the shoulders 510a-510b and/or analyze the features of the face 510c and the processors 106a-106n may calculate the size of the occupant 452b and/or approximate age of the occupant 452b. The processors 106a-106n may also determine a location of the seat 402b with respect to the interior of the vehicle 50. The decision module 158 may select the appropriate reaction based on the location of the seat 402b and/or the characteristics (e.g., age and/or size) of the occupant 452b.

In some embodiments, the CNN module 150 may be configured to perform facial recognition based on the detected head 510c. While the head 510c is shown in the example video frame 550, the apparatus 100 may be configured to perform the facial recognition on the faces of each of the passengers 452a-452n. The facial recognition operations performed by the CNN module 150 may be configured to determine where the head 510c is located in the video frame 550. Once the head 510c is located, the CNN module 150 may be configured to extract features and/or descriptors corresponding to the face of the occupant 452b.

The features and/or descriptors extracted corresponding to the face of the occupant 452b may be compared to features and/or descriptors stored in the memory 108. For example, the database 174 may comprise features and/or descriptors of faces of previously identified individuals. Similarly, the memory 108 may store features and/or descriptors of the seat 402b (e.g., seat color, stitching pattern, etc.) when empty. For example, the features and/or descriptors of the empty seat 402b may be used to determine if the seat 402b is occupied or not. In some embodiments, the apparatus 100 may be trained to detect a particular individual by capturing video frames of a particular person and then receiving an input from the person (e.g., a name, settings, preferences, etc.).

In some embodiments, the apparatus 100 may be configured to access a third-party database that comprises the features and/or descriptors for previously identified individuals. The features and/or descriptors of the face of the passenger 452b extracted by the processors 106a-106n may be checked against the stored features and/or descriptors to determine whether a match is found. If a match is found (e.g., a match having a sufficiently high level of confidence), then pre-configured climate setting preferences may be used for the climate zone that the passenger 452b is located in (e.g., the climate zone 404b, in the example shown).

In an example, each identified user may have the option to provide customized preferences for the climate settings. The customized preferences may be climate settings that may be used when the particular person is identified by the processors 106a-106n. For example, if an unknown person is detected, default climate settings (or limited settings if the unknown person is determined to be part of a class that has a climate setting limitation) may be provided by the signal VCTRL. In another example, if no passenger is detected, then the signal VCTRL may power off the climate controller 410b. In yet another example, if the person is identified using the facial recognition then the particular customized preferences may be provided by the signal VCTRL.

The customized preferences may be unique for the particular person. However, the customized preference may not need to be unique (e.g., multiple identified users may use the same climate setting preferences). In some embodiments, a particular person may have multiple sets of customized preferences. In an example, one person may have customized climate settings for day time driving and night time driving. In another example, one person may have different customized climate settings for each of the climate zones 404a-404n (e.g., a person may not want the window 504a opened while driving in the climate zone 404a, but may prefer having the window 504b open when sitting in the passenger seat 402b in the climate zone 404b). In some embodiments, the customized preferences may be limited based on the class of the particular person (e.g., the customized preferences of the passenger 452b may not override the climate setting limitations for the child classification of the passenger 452b). In an example, the customized preferences may comprise a preferred temperature, a preferred audio level, a preferred amount of seat warming, a preferred vibration intensity of a seat massager, etc. The number, type and/or amount of customized preferences for the climate settings for each identified individual may be varied according to the design criteria of a particular implementation.

In some embodiments, the characteristics of the passengers 452a-452n may comprise the amount and/or material of the clothing worn by the passengers 452a-452n. Different passengers may be wearing different clothing, which may affect a comfort level of each of the passengers 452a-452n. For example, on a hot summer day, one of the passengers 452a-452n may have lightweight clothing on (e.g., shorts, t-shirt, a lot of skin exposed, light fabric, etc.) and another of the passengers 452a-452n may have heavy clothing on (e.g., dress pants, a suit jacket, relatively little skin exposed, etc.). If each of the climate zones 404a-404n provide the same temperature then one or more of the passengers 452a-452n may be uncomfortable because of the clothing worn (e.g., the passenger in shorts and a t-shirt may be too cold if the air conditioning is set based on the passenger wearing a suit, and the passenger wearing the suit may be too hot if the air conditioning is set based on the passenger wearing shorts and a t-shirt).

The processors 106a-106n may be further configured to determine the characteristics of the passengers 452a-452n such as the clothing worn to determine how to adjust the climate settings for each of the climate zones 404a-404n. For example, different temperatures may be applied to each of the climate zones 404a-404n that has one of the passengers 452a-452n present based on the clothing detected. For example, the climate zones 404a-404n that have passengers present may be set to a baseline temperature and the baseline temperature may be increased or decreased in each of the climate zones 404a-404n based on the characteristics of the clothing worn by the detected passengers 452a-452n in the particular climate zones 404a-404n. The type and/or amount of adjustments to the climate settings in the climate zones 404a-404n based on the clothing worn by each of the passengers 452a-452n may be varied according to the design criteria of a particular implementation.

Figure 10:
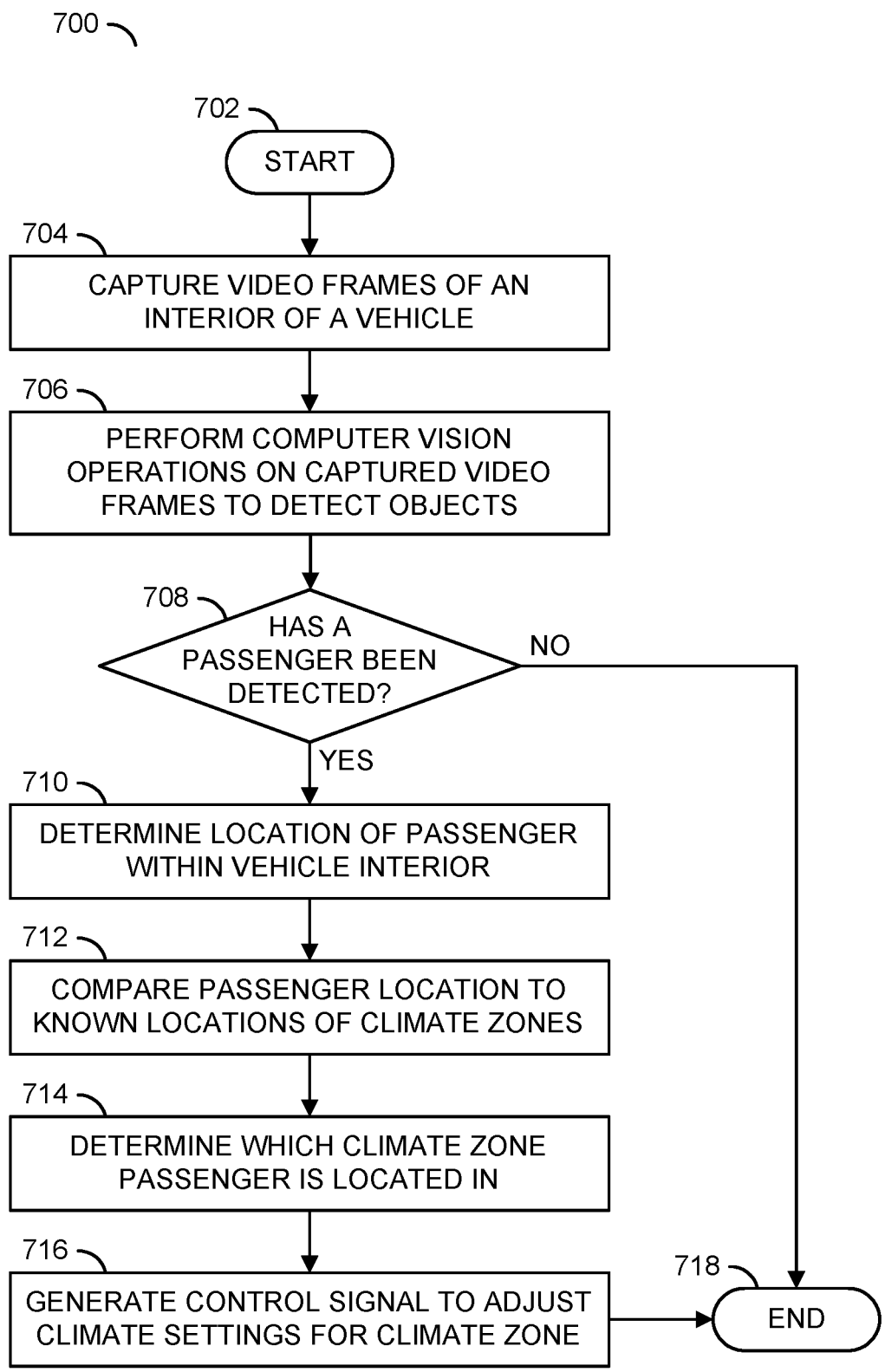
FIG. 10 is a flow diagram illustrating a method for generating a control signal to adjust climate settings for a climate zone.

Referring to FIG. 10, a method (or process) 700 is shown. The method 700 may generate a control signal to adjust climate settings for a climate zone. The method 700 generally comprises a step (or state) 702, a step (or state) 704, a step (or state) 706, a decision step (or state) 708, a step (or state) 710, a step (or state) 712, a step (or state) 714, a step (or state) 716, and a step (or state) 718.

The step 702 may start the method 700. In the step 704, the capture devices 102a-102n may capture the video frames FRAMES_A-FRAMES_N of an interior of the ego vehicle 50. In the step 706, the CNN module 150 of the processors 106a-106n may perform the computer vision operations on the captured video frames FRAMES_A-FRAMES_N to detect objects. Next, the method 700 may move to the decision step 708.

In the decision step 708, the decision module 158 may determine whether a passenger has been detected. For example, the CNN module 150 may be configured to perform object detection to determine the presence (or absence) of a person (or animal) in the ego vehicle 50. If one of the passengers 452a-452n has not been detected, then the method 700 may move to the step 718. If one of the passengers 452a-452n has been detected, the method 700 may move to the step 710.

In the step 710, the decision module 158 may determine the location of the detected passenger within the interior of the vehicle 50. In an example, the processors 106a-106n may determine which of the seats 402a-402n the detected passenger is sitting in. In another example, the processors 106a-106n may analyze which features of the vehicle 50 the detected passenger is sitting near (e.g., one of the windows 504a-504n). In yet another example, the processors 106a-106n may perform a calculation based on the location of the particular one of the capture devices 102a-102n that captured the video frames and the distance of the detected passenger from the camera. Next, the method 700 may move to the step 712.

In the step 712, the processors 106a-106n may compare the determined location of the detected passenger with the known locations of the climate zones 404a-404n (e.g., stored in the memory 108). Next, in the step 714, the processors 106a-106n may determine which of the climate zones 404a-404n that the detected passenger is located within (e.g., based on the spatial coordinates of the boundaries of the climate zones 404a-404n, based on which seat(s) 402a-402n correspond to the climate zones 404a-404n, etc.). In the step 716, the processors 106a-106n may generate the signal VCTRL. The signal VCTRL may be presented to the particular one of the climate controllers 410a-410n that corresponds to the climate zone 404a-404n that the detected passenger is located in. The signal VCTRL may be a climate control signal configured to adjust the settings for the particular one of the climate zones 404a-404n that the detected passenger is located in. Next, the method 700 may move to the step 718. The step 718 may end the method 700.

Figure 11:
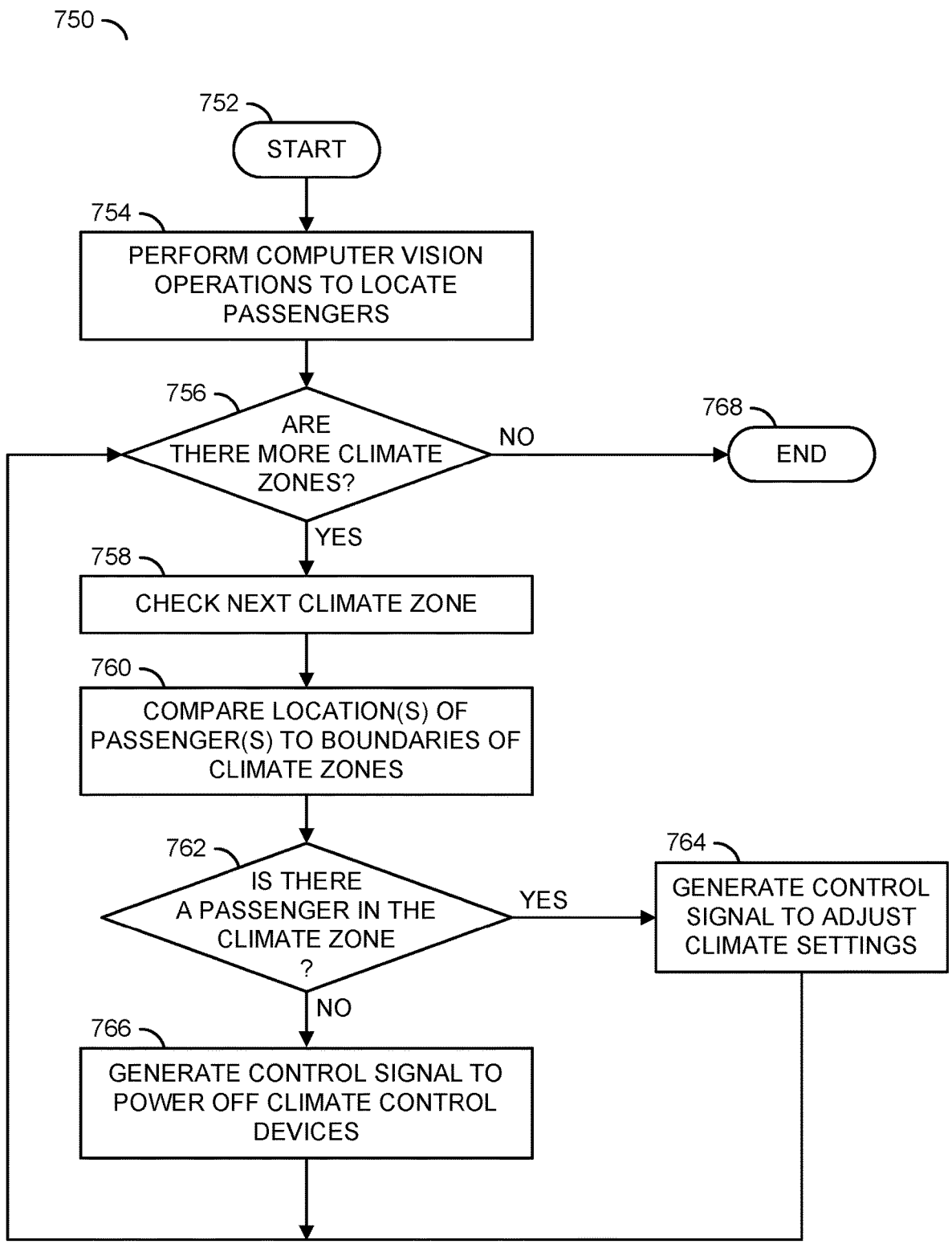
FIG. 11 is a flow diagram illustrating a method for conserving power based on a presence of a passenger in a climate zone.

Referring to FIG. 11, a method (or process) 750 is shown. The method 750 may conserve power based on a presence of a passenger in a climate zone. The method 750 generally comprises a step (or state) 752, a step (or state) 754, a decision step (or state) 756, a step (or state) 758, a step (or state) 760, a decision step (or state) 762, a step (or state) 764, a step (or state) 766, and a step (or state) 768.

The step 752 may start the method 750. In the step 754, the processors 106a-106n may perform the computer vision operations on the video frames FRAMES_A-FRAMES_N to locate the passengers 452a-452n within the ego vehicle 50. Next, the method 750 may move to the decision step 756.

In the decision step 756, the processors 106a-106n may determine whether there are more of the climate zones 404a-404n. In the example shown in the method 750, the processors 106a-106n are illustrated as analyzing the climate zones 404a-404n sequentially. However, the processors 106a-106n may be configured to analyze the climate zones 404a-404n and/or the locations of each of the detected passengers 452a-452n in parallel. If there are more climate zones 404a-404n, then the method 750 may move to the step 758. In the step 758, the processors 106a-106n may check the next one of the climate zones 404a-404n. In the step 760, the processors 106a-106n may compare the location(s) determined for the passenger(s) 452a-452n to the boundaries of the particular one of the climate zones 404a-404n. Next, the method 750 may move to the decision step 762.

In the decision step 762, the processors 106a-106n may determine whether there is at least one of the passengers 452a-452n in the particular one of the climate zones 404a-404n. If there is at least one of the passengers 452a-452n in the particular one of the climate zones 404a-404n, the method 750 may move to the step 764. In the step 764, the processors 106a-106n may generate the signal VCTRL to adjust the climate settings for the particular one of the climate zones 404a-404n having the detected passenger. Next, the method 750 may return to the decision step 756.

In the decision step 762, if there is not at least one of the passengers 452a-452n in the particular one of the climate zones 404a-404n, the method 750 may move to the step 766. In the step 766, the processors 106a-106n may generate the control signal VCTRL to power off the climate control devices (e.g., the actuators 116 corresponding to the particular one of the climate control devices 410a-410n) for the particular one of the climate zones 404a-404n. If the climate control device 410a-410n for the particular climate zone is already turned off, then the processors 106a-106n may not generate the signal VCTRL. Next, the method 750 may return to the decision step 756. In the decision step 756, if there are no more of the climate zones 404a-404n to analyze, then the method 750 may move to the step 768. The step 768 may end the method 750.

Figure 12:
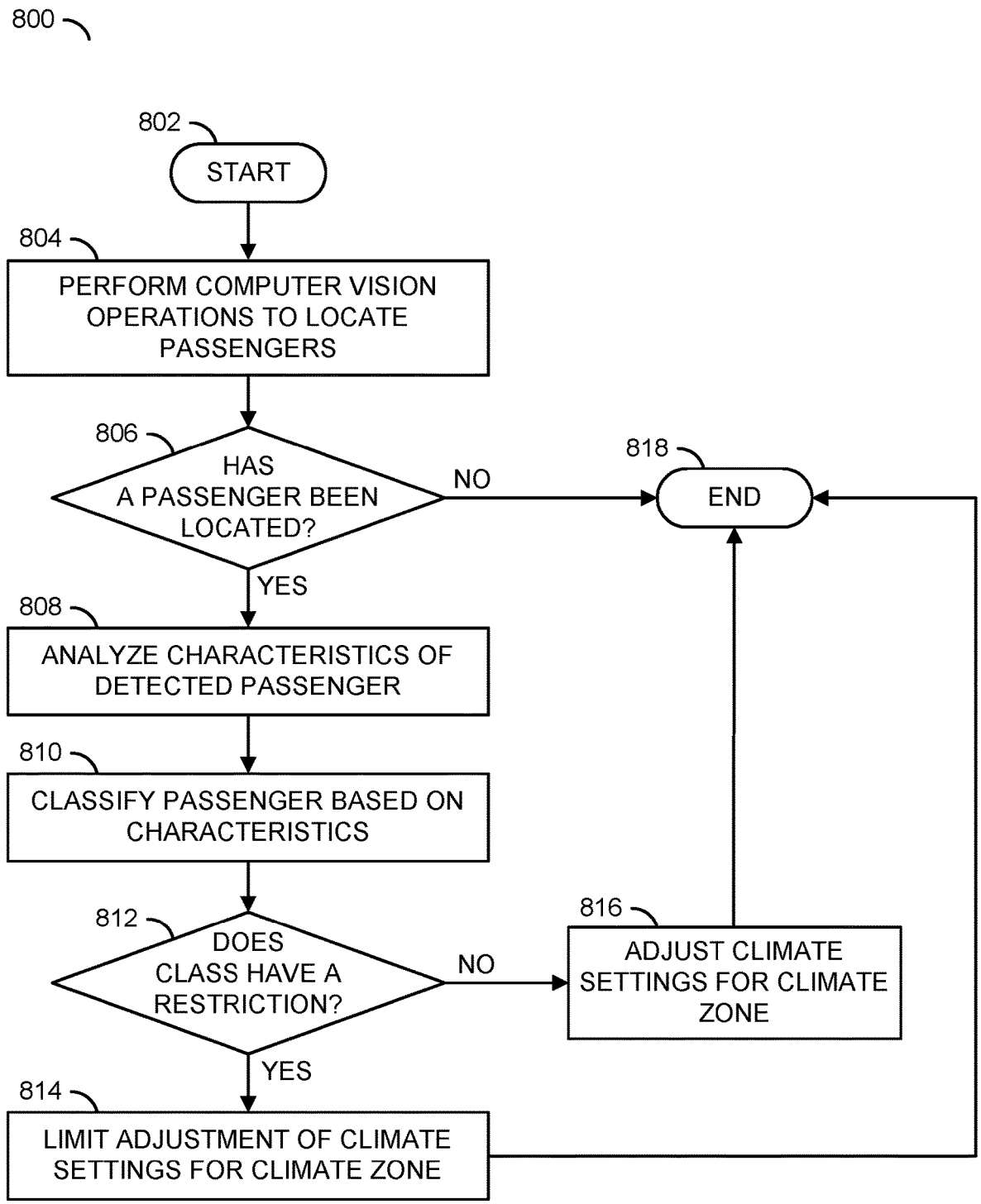
FIG. 12 is a flow diagram illustrating a method for limiting adjustments to climate settings in response to determining a particular class of passenger.

Referring to FIG. 12, a method (or process) 800 is shown. The method 800 may limit adjustments to climate settings in response to determining a particular class of passenger. The method 800 generally comprises a step (or state) 802, a step (or state) 804, a decision step (or state) 806, a step (or state) 808, a step (or state) 810, a decision step (or state) 812, a step (or state) 814, a step (or state) 816, and a step (or state) 818.

The step 802 may start the method 800. In the step 804, the processors 106a-106n may perform the computer vision operations on the video frames FRAMES_A-FRAMES_N to locate the passengers 452a-452n within the ego vehicle 50. Next, the method 800 may move to the decision step 806.

In the decision step 806, the processors 106a-106n may determine whether one or more of the passengers 452a-452n have been located. If none of the passengers 452a-452n have been located within the ego vehicle 50, the method 800 may move to the step 818. If at least one of the passengers 452a-452n have been located within the ego vehicle 50, the method 800 may move to the step 808. In the step 808, the CNN module 150 may analyze the passengers 452a-452n to perform the computer vision operations to detect the characteristics of the detected passengers 452a-452n. Next, in the step 810, the decision module 158 may classify the passengers 452a-452n based on the characteristics detected (e.g., classify a person as a child, an adult, elderly, classify the occupant as a pet, etc.). Next, the method 800 may move to the decision step 812.

In the decision step 812, the processors 106a-106n may determine whether the detected class has a restriction. For example, the database 174 may store various classifications for the passengers 452a-452n and/or any corresponding restrictions (e.g., limitations to the climate settings for the particular class). If the class does have a restriction, the method 800 may move to the step 814. In the step 814, the processors 106a-106n may limit the amount of adjustment to the climate settings for the corresponding one of the climate zones 404a-404n in response to the restriction and then generate the signal VCTRL with the limited adjustment. Next, the method 814 may move to the step 818.

In the decision step 812, if the class does not have a restriction, the method 800 may move to the step 816. In the step 816, the processors 106a-106n may adjust the climate settings for the particular one of the climate zones 404a-404n by generating the signal VCTRL with the default climate settings. Next, the method 800 may move to the step 818. The step 818 may end the method 800.

Figure 13:
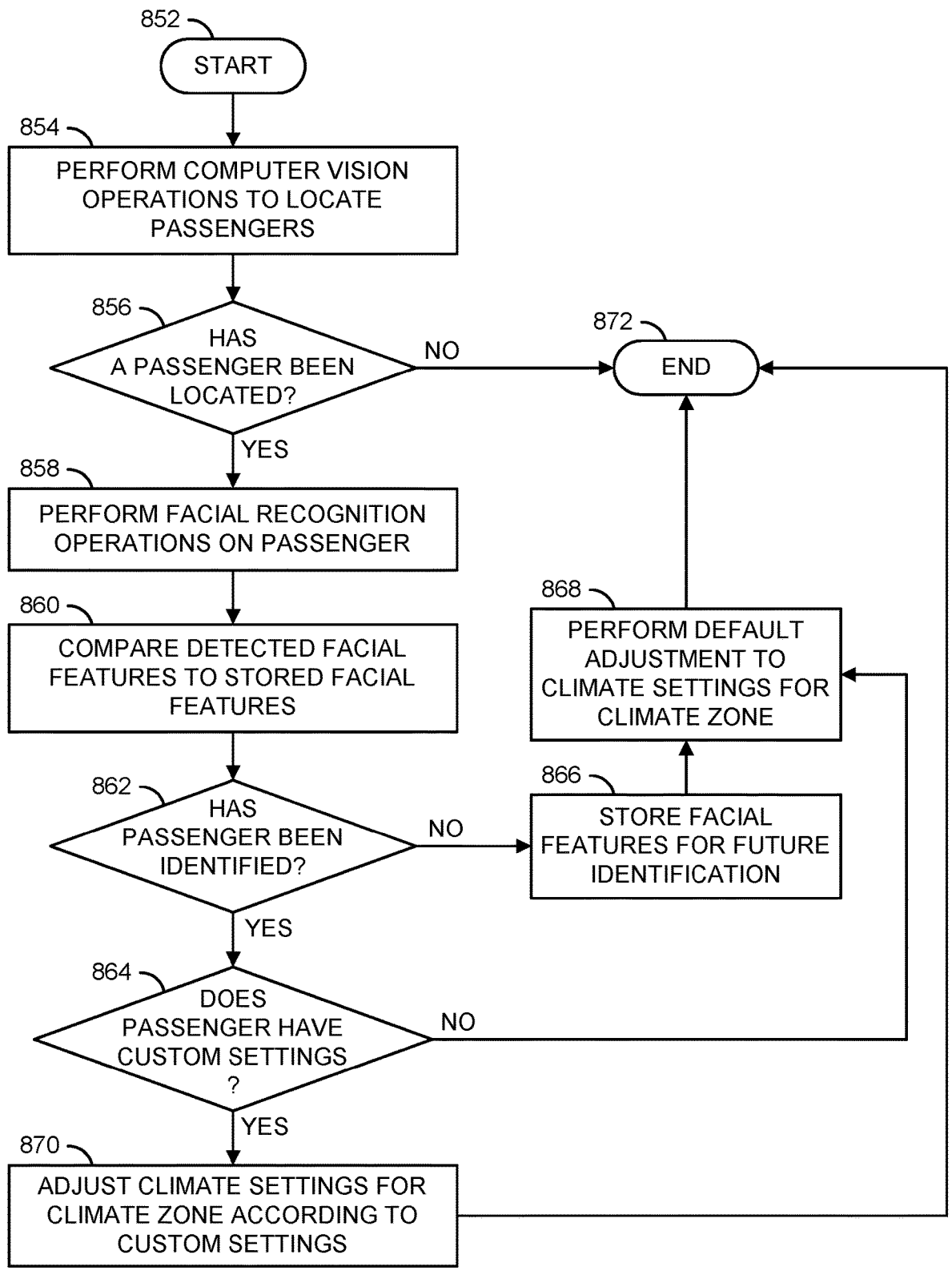
FIG. 13 is a flow diagram illustrating a method for providing customized climate settings using facial recognition to identify a passenger.

Referring to FIG. 13, a method (or process) 850 is shown. The method 850 may provide customized climate settings using facial recognition to identify a passenger. The method 850 generally comprises a step (or state) 852, a step (or state) 854, a decision step (or state) 856, a step (or state) 858, a step (or state) 860, a decision step (or state) 862, a decision step (or state) 864, a step (or state) 866, a step (or state) 868, a step (or state) 870, and a step (or state) 872.

The step 852 may start the method 850. In the step 854, the processors 106a-106n may perform the computer vision operations on the video frames FRAMES_A-FRAMES_N to locate the passengers 452a-452n within the ego vehicle 50. Next, the method 850 may move to the decision step 856.

In the decision step 856, the processors 106a-106n may determine whether one or more of the passengers 452a-452n have been located. If none of the passengers 452a-452n have been located within the ego vehicle 50, the method 850 may move to the step 872. If at least one of the passengers 452a-452n have been located within the ego vehicle 50, the method 850 may move to the step 858. In the step 858, the CNN module 150 may perform the facial recognition operations on the detected passenger(s) 452a-452n. Next, in the step 860, the decision module 158 may compare the detected facial features extracted from the video frames FRAMES_A-FRAMES_N to the facial features stored in the database 174. Next, the method 850 may move to the decision step 862.

In the decision step 862, the processors 106a-106n may determine whether one of the passengers 452a-452n has been identified. For example, the passenger may be identified as a unique individual when there is a match with a sufficient confidence level of the extracted facial features with the stored facial features. If the passenger has been identified, then the method 850 may move to the decision step 864. In the decision state 864, the processors 106a-106n may determine whether the identified passenger has custom settings. For example, the processors 106a-106n may check the database 174 to find any climate settings that are associated with the identified passenger. If the detected passenger does not have custom settings, then the method 850 may move to the step 868.

In the decision step 862, if the passenger has not been identified, then the method 850 may move to the step 866. In the step 866, the processors 106a-106n may store the extracted facial features of the detected passenger in the database 174 (e.g., for potential future identifications). Next, in the step 868, the processors 106a-106n may generate the signal VCTRL to perform the default adjustment to the climate settings for the particular one of the climate zones 404a-404n. Next, the method 850 may move to the step 872.

In the decision step 864, if the identified passenger does have custom settings stored in the database 174, then the method 850 may move to the step 870. In the step 870, the processors 106a-106n may retrieve the stored climate settings from the database 174 and generate the signal VCTRL to adjust the climate settings for the particular one of the climate zones 404a-404n according to the customized climate settings. Next, the method 850 may move to the step 872. The step 872 may end the method 850.

The functions performed by the diagrams of FIGS. 1-12 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
an interface configured to receive pixel data corresponding to an interior of a vehicle; and
a processor configured to (i) process said pixel data arranged as video frames, (ii) perform computer vision operations on said video frames to detect objects in said video frames, (iii) detect one or more passengers based on said objects detected in said video frames, (iv) determine a location of each of said passengers detected with respect to said interior of said vehicle based on said computer vision operations and (v) generate a climate control signal for each of said passengers, wherein
(a) said climate control signals are each implemented to control climate settings in one of a plurality of climate zones within said vehicle,
(b) said processor correlates said location of each of said passengers to said climate zones,
(c) said plurality of climate zones enable said climate settings for each of said passengers to have granular settings on an individual basis,
(d) said computer vision operations are configured to determine an identity of each of said passengers,
(e) each of said climate control signals are configured to (i) select custom settings for said climate settings if said custom settings are stored for said identity located in one of said climate zones and (ii) select default settings for said climate settings if said custom settings are not stored for said identity located in one of said climate zones.

2. The apparatus according to claim 1, wherein said climate control signals are each configured to set said climate settings to turn off heating/cooling in each of said climate zones that do not have one of said passengers present.

3. The apparatus according to claim 1, wherein each of said climate zones correspond to one of a plurality of seat locations within said vehicle.

4. The apparatus according to claim 1, wherein said climate settings are configured to adjust a temperature of one or more of said climate zones.

5. The apparatus according to claim 1, wherein said climate control signals are configured to adjust said climate settings for each of said climates zones independently.

6. The apparatus according to claim 1, wherein (i) one or more of said passengers have said custom settings for said climate settings and (iii) said custom settings are different for each of said passengers.

7. The apparatus according to claim 1, wherein said processor is further configured to implement facial recognition for determining said identity of one or more of said passengers.

8. The apparatus according to claim 1, wherein said processor is further configured to (i) detect characteristics of said passengers and (ii) restrict said climate control settings in response to said characteristics.

9. The apparatus according to claim 8, wherein (i) said characteristics comprise an age of said passengers and (ii) said climate control settings for one of said passengers are restricted to a maximum cooling value when said age of said one of said passengers is below a threshold value.

10. The apparatus according to claim 1, wherein said apparatus is configured to optimize a heating/cooling system of said vehicle based on occupancy of said vehicle detected using said computer vision operations to save energy.

11. The apparatus according to claim 1, wherein said processor comprises a dedicated hardware module configured to perform feature extraction to calculate descriptors for determining a likelihood that pixels of said video frames belong to said objects that correspond to said passengers.

12. The apparatus according to claim 1, wherein said climate settings comprise at least one of an air temperature, a seat temperature, an amount of airflow from a fan, an audio level, an intensity of vibration for a seat massager, and how much a window is opened.

13. The apparatus according to claim 1, wherein each of said climate zones are an area of space within said vehicle for one of said passengers.

14. The apparatus according to claim 1, wherein one or more of said climate zones is an area of space within said vehicle for more than one of said passengers.

15. The apparatus according to claim 1, wherein each of said climate zones comprises one or more actuators configured to adjust said climate settings for said climate zones in response to one of said climate control signals.

16. The apparatus according to claim 1, wherein (i) said computer vision operations detect said objects by performing feature extraction based on weight values for each of a plurality of visual features that are associated with said objects extracted from said video frames, (ii) said weight values are determined in response to an analysis of training data by said processor prior to said feature extraction and (iii) a data flow of said feature extraction comprises manipulating lists of regions of a vector that each share a common attribute and are grouped together based on said visual features.

17. The apparatus according to claim 1, wherein said processor is further configured to (i) store said identity of one of said passengers if said custom settings are not stored for said identity located in one of said climate zones, (ii) determine adjustments made to said default settings in said one of said climate zones and (iii) store said custom settings with said identity located in one of said climate zones.

18. The apparatus according to claim 1, wherein said custom settings are adjusted in response to a time of day.

19. The apparatus according to claim 1, wherein said custom settings for said identity comprises different settings for one or more of said climate zones.

20. The apparatus according to claim 1, wherein said computer vision operations are further configured to (i) determine a type of clothing worn by said passengers and (ii) adjust said climate settings in response to said type of clothing worn by said passengers.

* * * * *